US012370677B2

(12) United States Patent
Nichols et al.

(10) Patent No.: US 12,370,677 B2
(45) Date of Patent: Jul. 29, 2025

(54) AERIAL ROBOTIC SYSTEMS

(71) Applicant: Altec Industries, Inc., Birmingham, AL (US)

(72) Inventors: Robert Nichols, Saint Joseph, MO (US); Jonathan Westin Sykes, Gower, MO (US); Sebastian Orellana, Kansas City, MO (US); Timothy J. Mourlam, Shawnee, KS (US); David F. Lindquist, Cameron, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 18/395,944

(22) Filed: Dec. 26, 2023

(65) Prior Publication Data

US 2025/0205881 A1   Jun. 26, 2025

(51) Int. Cl.
  *B25J 9/16* (2006.01)
  *B25J 19/02* (2006.01)

(52) U.S. Cl.
  CPC ............. *B25J 9/162* (2013.01); *B25J 9/1664* (2013.01); *B25J 19/023* (2013.01)

(58) Field of Classification Search
  CPC ......... B25J 9/162; B25J 9/1664; B25J 19/023
  See application file for complete search history.

(56) References Cited

U.S. PATENT DOCUMENTS

| 6,507,163 | B1 | 1/2003 | Allen |
| 10,658,822 | B2 | 5/2020 | Devine et al. |
| 11,660,750 | B1 | 5/2023 | Sykes et al. |
| 11,717,969 | B1 | 8/2023 | Mourlam et al. |
| 11,742,108 | B1 | 8/2023 | Naber et al. |
| 11,749,978 | B1 | 9/2023 | Lindquist et al. |

(Continued)

FOREIGN PATENT DOCUMENTS

| CN | 207588353 U | 7/2018 |
| CN | 112372619 A | 2/2021 |

OTHER PUBLICATIONS

U.S. Appl. No. 18/396,009 Non-Final Office Action issued Aug. 8, 2024.

(Continued)

*Primary Examiner* — Adam R Mott
*Assistant Examiner* — Matthew C Gammon
(74) *Attorney, Agent, or Firm* — Erise IP, P.A.

(57) ABSTRACT

Systems and methods for performing a task in an aerial work environment by a robot system are described herein. An aerial robot system may be provided at a boom tip of an aerial device for performing work on aerial power/telecommunication systems. The aerial robot system may comprise manipulators including one or more robot unit manipulators and one or more auxiliary arms provided in a side-by-side configuration. The side-by-side configuration reduces a vertical profile of the aerial robot system over standard systems providing methods for accessing all points on standard aerial work environments. Furthermore, the aerial robot system may be configured to provide all necessary tools and replacements parts as well as storage for removal of parts in the aerial work environment. Aerial tasks may be performed by an operator, autonomously, or a combination of manual and autonomous.

20 Claims, 11 Drawing Sheets

(56) References Cited

U.S. PATENT DOCUMENTS

| | | | | |
|---|---|---|---|---|
| 11,794,359 | B1 | 10/2023 | Sykes et al. | |
| 2001/0055525 | A1* | 12/2001 | Inokuchi | B25J 5/06 |
| | | | | 414/730 |
| 2008/0312769 | A1* | 12/2008 | Sato | B25J 9/1687 |
| | | | | 901/31 |
| 2015/0097348 | A1* | 4/2015 | Steinfels | F16M 11/2092 |
| | | | | 280/47.35 |
| 2019/0302810 | A1* | 10/2019 | Kibler | B25J 15/0019 |
| 2023/0123463 | A1* | 4/2023 | Lin | B25J 9/1651 |
| | | | | 700/248 |

OTHER PUBLICATIONS

U.S. Appl. No. 18/396,009 Notice of Allowance issued Sep. 26, 2024.

PCT Patent Application PCT/US2024/56862 International Search Report and Written Opinion of the International Searching Authority issued Mar. 13, 2025.

* cited by examiner

AERIAL ROBOTIC SYSTEMS

FIELDS

The present disclosure generally pertains to aerial robotic systems as well as methods and operations associated with aerial robotic systems. Specifically, the disclosure relates to collaborative control of various robotic systems in electrified aerial work environments.

BACKGROUND

An aerial robotic system may be used to perform work at an aerial worksite, including aerial worksites associated with electrical transmission lines. Aerial worksites as well as electrical transmission lines are accompanied by a variety of hazards. Certain hazards can be mitigated by using aerial robotic systems to perform at least some of the work. Additionally, or in the alternative, certain tasks can be streamlined by use of aerial robotic systems.

Furthermore, typical aerial robot systems may be limited by dexterity and load. For example, high-dexterity manipulators typically have low load limits relative to some equipment and tools that may be necessary for performing work in aerial work environments. Similarly, or alternatively, high-capacity manipulators capable of handling heavy loads are typically limited in degrees of freedom, and therefore lack the dexterity required for some tasks.

Further still, actions such as, waste removal and tool changing typically requires human interaction. Therefore, the aerial device must bring the aerial robot systems to the ground to change tools and remove waste. These are time-consuming processes. Furthermore, the combination of various components perform work in aerial environments presents many problems such as, working in tight spaces with several manipulators while maintaining minimum distances between electrified and non-electrified components.

What is needed are systems and methods of operating robot systems in electrified aerial environments to perform tasks from beginning to end without removing the robot systems from the aerial work environment.

SUMMARY

Aspects, features, and advantages of the presently disclosed subject matter are set forth in part in the following description. Further aspects and advantages may be apparent from the description or through practicing the presently disclosed subject matter.

In some aspects, the techniques described herein relate to a robot system for performing aerial tasks in an aerial work environment. The robot system includes at least one processor, a platform disposed at a boom tip, a robot unit disposed on the platform, the robot unit including at least one utility arm configured to perform a first task in the aerial work environment, a robotic auxiliary arm configured to perform a second task in the aerial work environment, and one or more input devices associated with a user and communicatively coupled to the at least one processor for controlling the robot unit and the robotic auxiliary arm, wherein the robotic auxiliary arm is coupled to the platform and arranged in a side-by-side configuration with the robot unit.

In some aspects, the techniques described herein relate to the robot system, further including a plurality of sensors detecting a position of the at least one utility arm and the robotic auxiliary arm, and wherein the at least one processor is configured to maintain a threshold minimum distance between the at least one utility arm and the robotic auxiliary arm.

In some aspects, the techniques described herein relate to the robot system, wherein the at least one processor is further configured to obtain, from at least one sensor of the plurality of sensors, a location of electrically energized components of an aerial power system, and maintain a threshold minimum power distance between components of the robot system and the electrically energized components of the aerial power system.

In some aspects, the techniques described herein relate to the robot system, further including a receptacle disposed on the platform adjacent the robot unit and between the robot unit and the boom tip, wherein the receptacle includes an opening configured to receive parts.

In some aspects, the techniques described herein relate to the robot system, further including a receptacle hole in a bottom of the opening configured to receive at least a portion of the parts, and a receptacle cone configured to be disposed in the receptacle hole to prevent small parts from falling through the opening.

In some aspects, the techniques described herein relate to the robot system, a plurality of joints configured to provide movement to the robotic auxiliary arm, wherein a joint of the plurality of joints is disposed below the receptacle.

In some aspects, the techniques described herein relate to the robot system, further including a tool rack coupled to a receptacle between the robot unit and the boom tip, wherein the tool rack includes a plurality of tool holders configured to hold tools.

In some aspects, the techniques described herein relate to the robot system, wherein the tool rack is a linear rack holding tools in a linear configuration, and wherein the tools are configured to be coupled to the at least one utility arm in an automated attachment process.

In some aspects, the techniques described herein relate to the robot system for performing aerial tasks in an aerial work environment, including an input device configured to receive input by an operator of the robot system, a platform disposed on a boom tip of an aerial device, a robot unit disposed on the platform including at least one utility arm, an auxiliary arm disposed on the platform and arranged in a side-by-side configuration with the robot unit to minimize a vertical physical profile of the robot system, sensors disposed on the platform and configured to detect a state of the aerial work environment including a robot state of the robot unit and the auxiliary arm, at least one processor configured to receive input commands, generate automated commands, and cause actuation of a plurality of actuators to control the robot unit and the auxiliary arm, and one or more non-transitory computer-readable media including computer-executable instructions that, when executed by the at least one processor, cause movement of at least the robot unit and the auxiliary arm to perform a method of performing the aerial tasks in the aerial work environment. The method includes receiving a first input by the input device to control the at least one utility arm and the auxiliary arm to perform a first task in the aerial work environment, receiving a second input by the input device to activate an automated sequence; and controlling the at least one utility arm to perform the automated sequence.

In some aspects, the techniques described herein relate to the robot system, further including a tool rack including tools configured to attach to the at least one utility arm. Wherein the automated sequence includes receiving input from the operator to attach a tool of the tools to the at least one utility arm, obtaining an automated tool exchange algorithm based at least in part on a task and including instructions to couple the tool to the at least one utility arm, and controlling the at least one utility arm to couple the tool to the at least one utility arm as instructed by the automated tool exchange algorithm.

In some aspects, the techniques described herein relate to the robot system, further including a receptacle including an opening for receiving parts. The automated sequence includes receiving input from the operator to place a part in the receptacle, obtaining an automated waste disposal algorithm including instructions to control the at least one utility arm to place the part in the receptacle, and controlling the at least one utility arm to place the part in the receptacle as instructed by the automated waste disposal algorithm.

In some aspects, the techniques described herein relate to the robot system, wherein the receptacle is coupled to the platform between the robot unit and the auxiliary arm, and wherein the tool rack is coupled to the receptacle.

In some aspects, the techniques described herein relate to the robot system, wherein the at least one utility arm includes a first utility arm disposed on a first side of the robot unit and a second utility arm disposed on a second side of the robot unit opposite the first side, wherein the auxiliary arm is provided on the first side in the side-by-side configuration, and wherein the automated sequence includes automatically maintaining the first utility arm in a shoulder-up configuration and the second utility arm in a shoulder-down.

In some aspects, the techniques described herein relate to the robot system, further including a plurality of tools disposed on a tool rack. The automated sequence includes obtaining a tool from the tool rack by the first utility arm while the auxiliary arm is configured to be in the side-by-side configuration.

In some aspects, the techniques described herein relate to a robot system, wherein the method further includes automatically maintaining a minimum threshold distance between the at least one utility arm and the auxiliary arm, and providing haptic, visual, or audible feedback by the input device when the at least one utility arm and the auxiliary arm approach the minimum threshold distance.

In some aspects, the techniques described herein relate to a method of controlling an aerial robot system to perform aerial tasks in an aerial work environment. The method includes receiving a first input by an input device to control at least one utility arm of a robot unit and an auxiliary arm to perform a first task in the aerial work environment, wherein the robot unit and the auxiliary arm are disposed on a platform coupled to a boom of an aerial device, wherein the auxiliary arm is configured in a side-by-side configuration with the robot unit, receiving a second input by the input device to activate an automatic sequence, and controlling the at least one utility arm to perform the automatic sequence.

In some aspects, the techniques described herein relate to a method, wherein a task of the aerial tasks is removal of an aerial component from the aerial work environment by the at least one utility arm.

In some aspects, the techniques described herein relate to a method, wherein the automated sequence includes controlling the at least one utility arm to place the aerial component into a receptacle, and retrieving a replacement component from a parts holder.

In some aspects, the techniques described herein relate to a method, wherein the aerial component is a pin insulator, and the method further includes placing the pin insulator in the receptacle in a vertical orientation with a pin of the pin insulator pointing downward, and inserting the pin into a hole at a bottom of the receptacle.

In some aspects, the techniques described herein relate to a method, wherein the auxiliary arm is a first auxiliary arm, and wherein the method further includes grasping and supporting a phase by a second auxiliary arm, wherein the second auxiliary arm is coupled to the platform and includes a shaft with a circular cross section.

These and other aspects, features, and advantages thereof are further understood with reference to the following description, the accompanying drawing figures, and the appended claims. The foregoing summary is not intended to identify key features or essential features of the claimed subject matter, nor is it intended to limit the scope of the claimed subject matter.

BRIEF DESCRIPTION OF THE DRAWING FIGURES

Embodiments of the present are described in detail below with reference to the attached drawing figures, wherein.

Figure 1:
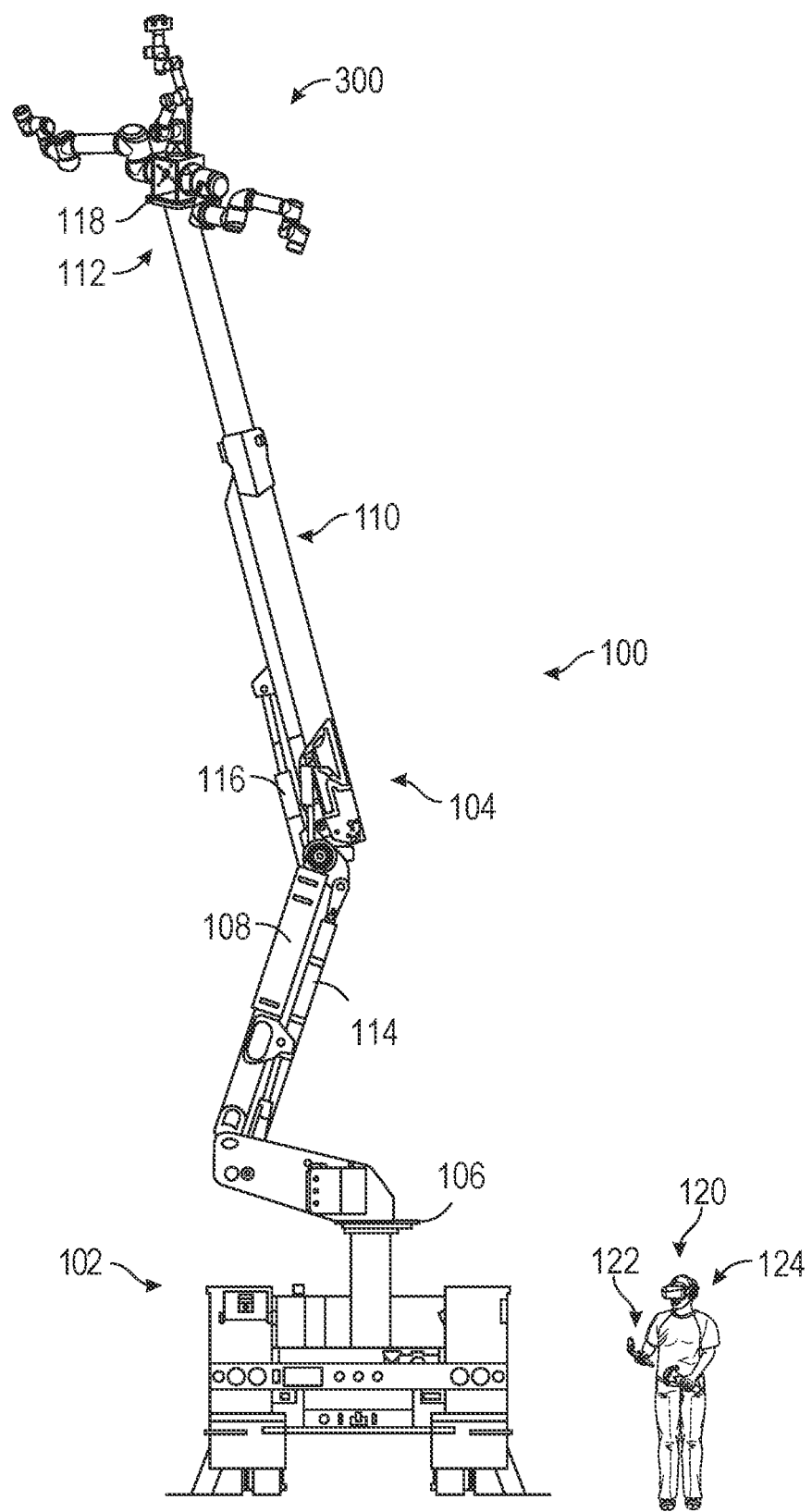
FIG. 1 depicts an aerial device relating to some embodiments.

The drawing figures illustrate example embodiments of the presently disclosed subject matter. The claims are not limited to the example embodiments depicted in the drawing figures. The aspects and features depicted in the drawing figures are not necessarily to scale. Repeat use of reference characters in the specification and drawing figures represent the same or analogous aspects or features.

DETAILED DESCRIPTION

The following detailed description references the accompanying drawing figures that illustrate example embodiments of the presently disclosed subject matter. The present disclosure, including the example embodiments depicted in the drawing figures, describe features, aspects, and advantages of the of the disclosed subject matter by way of explanation and not limitation. Various modifications, combinations, and variations can be made to the example embodiments or to aspects or features thereof without departing from the scope of the presently disclosed subject matter. Thus, the present disclosure encompasses such modifications, combinations, and variations. The present disclosure provides sufficient detail to enable those skilled in the art to practice the claimed subject matter. The present disclosure is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features referred to are included in at least one embodiment of the presently disclosed subject matter. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the scope of the presently disclosed subject matter encompasses a variety of combinations and/or integrations of the example embodiments in this description.

The terms "a," "an," and "the" do not denote a limitation of quantity but rather denote the presence of at least one of the referenced item. The terms "first," "second," "third," and so forth may be used interchangeably to distinguish one item from another and are not intended to signify location or importance of the respective item. Range limitations in this description and in the claims include all endpoints, and all such endpoints are independently combinable to provide another range limitation.

The term "coupled," when used herein with reference to at least two objects, refers to direct or indirect mechanical or physical contact between two objects in which the two objects are linked, connected, fastened, or joined with one another, including by way of an interference fit, one or more fastening elements or hardware, by welding, or the like. The term "coupled" includes objects that are removably coupled with one another.

Generally, the present disclosure provides an aerial robot assembly configured to remotely work on components of an aerial system in an aerial work environment. In some embodiments, the aerial robot assembly comprises sensors for detecting the aerial work environment and states of a base vehicle, a boom assembly, and robots positioned at a boom tip of the boom assembly of the aerial system. In some embodiments, the aerial robot assembly may comprise a robot unit comprising robot appendages, referenced herein as manipulators and utility arms, and one or more auxiliary arm for performing work in the aerial work environment. The auxiliary arm may be configured to work in a side-by-side orientation with the robot unit providing a low vertical profile such that the aerial robot unit may fit between phases of the aerial power system. Furthermore, the configuration of the aerial robot system may provide reachable waste receptacles and accessible tool racks for disposing of waste, storing objects, and changing tools and objects while remaining in the aerial work environment without lowering the aerial robot assembly. The configurations of the aerial robot system described herein provide consistent and repeatable that are both operator-commanded and automatic.

Aerial Device

FIG. 1 depicts an aerial device 100 relating to some embodiments. Aerial device 100 may be attached to utility vehicle 102, as shown. In some embodiments, aerial device 100 comprises boom assembly 104 and turntable 106 that may be disposed on utility vehicle 102, as shown. Boom assembly 104 may comprise lower boom section 108 attached to turntable 106 at a proximal end and upper boom section 110 pivotably attached to a distal end of lower boom section 108, as shown. In some embodiments, either or both of lower boom section 108 and upper boom section 110 may include a telescoping portion for telescopically extending and retracting the length of boom assembly 104. Furthermore, in some embodiments, a utility platform may be included, attached at a distal end (or boom tip 112) of upper boom section 110. Alternatively, or additionally, in some embodiments, aerial robot system 300 may be disposed at boom tip 112 of upper boom section 110. In some embodiments, and as described in greater detail below, aerial robot system 300 may be adapted for performing telecommunications repair, powerline repair, general repair work, or other actions that may be performed by a robot. For example, aerial robot system 300 may comprise one or more utility tools for performing actions such as sawing, cutting, screwing, wiring, or other actions associated with repair work. In some embodiments, boom assembly 104 may be used to position aerial robot system 300 in a remote location, such as, for example adjacent to an energized power line (e.g., aerial power system 402) in aerial work environment 400.

In some embodiments, aerial device 100 may be used for performing work on or near high-voltage power lines. As such, aerial device 100 may be operated near electrically powered high-voltage cables. In some embodiments, aerial robot system 300 and boom assembly 104 comprise insulating material for electrically insulating aerial device 100. Furthermore, any electrical components disposed in a utility platform and on boom assembly 104 may be self-contained and separate from the electrical components of utility vehicle 102. As such, a dielectric gap is created between aerial robot system 300 and utility vehicle 102. In some embodiments, utility vehicle 102 may generally be referred to as a base, and may be any of a vehicle, a crane, a platform, a truck bed, a mechanical tree trimming apparatus, a hydraulic lift, or any other base capable of supporting boom assembly 104 and aerial robot system 300, as will be described in further detail below.

In some embodiments, boom assembly 104 comprises one or more cylinders for controlling motion of boom assembly 104 such as lower boom cylinder 114 disposed between the turntable 106 and lower boom section 108 and upper boom cylinder 116 disposed between the lower boom section 108 and the upper boom section 110, as shown. In some embodiments, lower boom cylinder 114 and upper boom cylinder 116 may be actuated hydraulically using a hydraulics system of the boom assembly 104. However, embodiments are contemplated in which other suitable actuation techniques may be employed to actuate the cylinders such as, for example, electrical actuation, pneumatic actuation, and magnetic actuation. Furthermore, in some embodiments, a combination of different actuation techniques may be used. Embodiments are contemplated in which boom assembly 104 comprises one or more rotary actuators. For example, in some embodiments, boom assembly 104 comprises a slew drive for controlling rotation of any respective joints of the boom assembly 104 as described in more detail below.

In some embodiments, lower boom cylinder 114 may control an angle of rotation of lower boom section 108 relative to the turntable 106. Similarly, upper boom cylinder 116 may control an angle of rotation of upper boom section 110 relative to lower boom section 108. Additionally, in some embodiments, pivotable connection 118 may be included at boom tip 112 between the distal end of upper boom section 110 and aerial robot system 300 for controlling the angle of aerial robot system 300. In some such embodiments, pivotable connection 118 may be configured to automatically maintain an upright orientation of aerial robot system 300. For example, pivotable connection 118 may include one or more gyroscopes, accelerometers, strain gauges, and the like and/or interface with a control system for maintaining the upright orientation of aerial robot system 300 such that aerial robot system 300 is held in an upright position regardless of the orientation of boom assembly 104. Additionally, or in the alternative, embodiments are contemplated in which the orientation of aerial robot system 300 may be controlled manually by operator 120 using input devices 122 and head-up display 124.

Aerial Robot System

Figure 2:
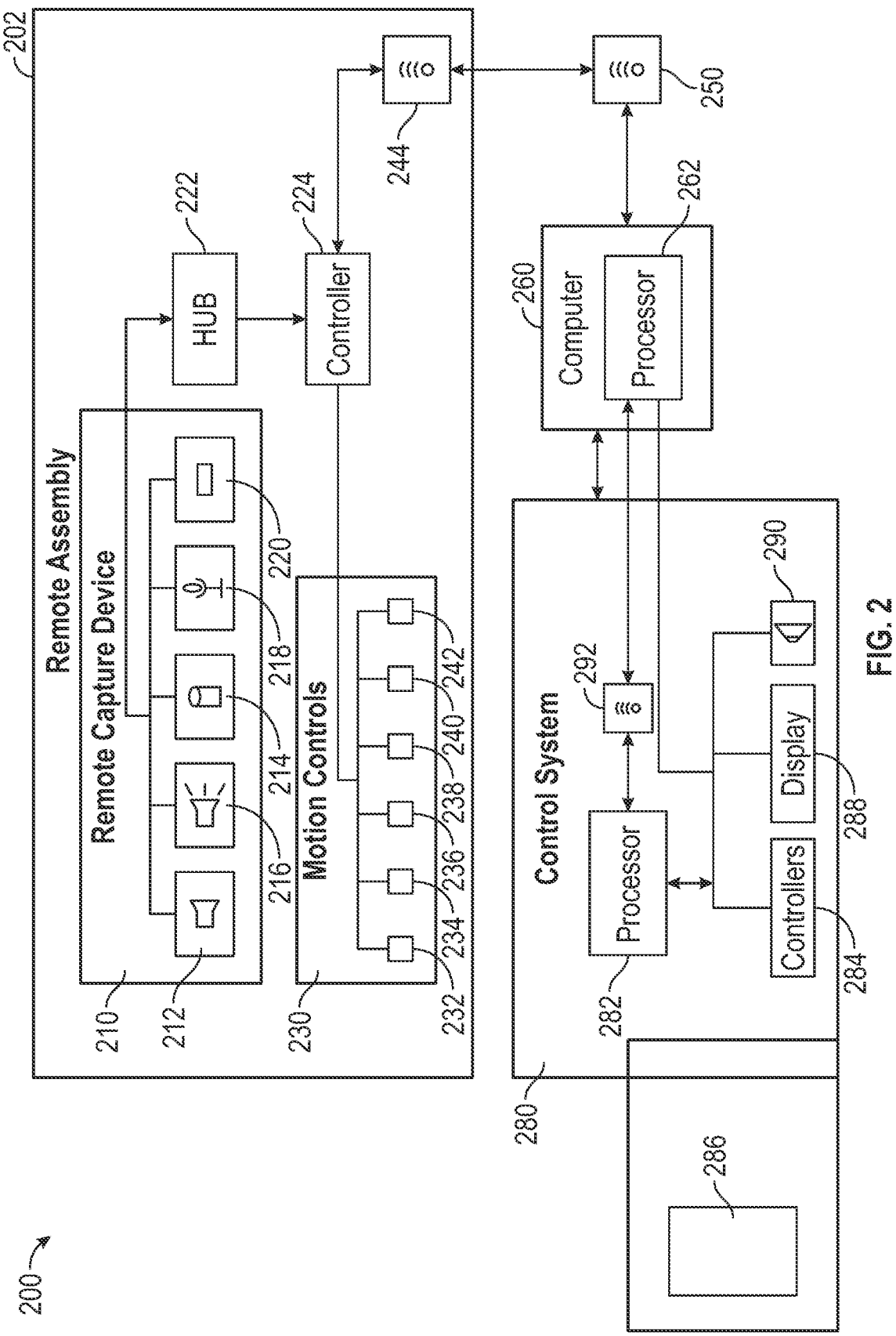
FIG. 2 depicts an exemplary system architecture of an aerial robot system comprising a control system and manual controls relating to some embodiments.

FIG. 2 depicts exemplary block diagram 200 related to embodiments of the present disclosure. In some embodiments, aerial robot system 300 comprises various assemblies, sub-assemblies, parts, or components for capturing sensory information and/or for performing actions, such as repair work in a telecommunication setting. In some embodiments, aerial robot system 300 comprises remote assembly 202 depicted in FIG. 2. Aerial robot system 300 may comprise various circuitry, parts, or other components for capturing sensory information, including video, three-dimensional depth information, audio, and other sensory data. Furthermore, aerial robot system 300 may comprise a manually controlled or autonomous robot unit that may be positioned at boom tip 112 of boom assembly 104 for interacting with aerial power system 402 (FIG. 4A)) in aerial work environment 400 (FIG. 4A) to perform one or more tasks. For example, as described above, in many real-life scenarios, tasks to be performed may not be discovered until reaching the job site, and/or detecting the aerial work environment, and accordingly, the robot unit may comprise a variety of tools, features, or functions to respond to a variety of tasks. Additionally, as described in greater detail below, aerial robot system 300 may further comprise one or more parts, components, or features for providing operator 120 with sensory information, providing operator 120 with additional information about aerial work environment to improve efficiency for both the aerial robot system 300 and operator 120.

As depicted in the block diagram 200, aerial robot system 300 comprises remote assembly 202, remote capture device 210, computer 260, and control system 280. In some embodiments, and as described in greater detail herein, remote capture device 210 may be configured and adapted for the capturing of sensory information and may be positioned in the aerial work environment on one or more robots (e.g., robot unit 302 and auxiliary arm 304) for capturing of sensory information that may be utilized by computer 260, to present information to operator 120 via control system comprising input devices 122 and head-up display 124, among other purposes. FIG. 2 depicts exemplary sensors, cameras, and other apparatuses that may be utilized by remote capture device 210 for the capturing of sensory information. Remote capture device 210 may be mounted or positioned on a selectively movable mount or portion of aerial robot system 300. For example, aerial robot unit 302 may be positioned at boom tip 112 of a boom assembly 104 for aerial application. However, remote capture device 210 may also be used with a robot unit that is not attached to boom assembly 104, and for example, may be utilized with a robot unit for ground application or attached to a mechanical arm (e.g., auxiliary arm 304) or an aerial drone. Accordingly sensory information may be captured by remote capture device 210 at any location.

Through selective inputs, including both manually inputted instructions and/or automated instructions, remote capture device 210 may capture video, still images, three-dimensional depth information, audio, electrical conductivity, voltage, among other information that may be captured by a sensor or recording device. For example, remote capture device 210 may comprise camera 212 for the capturing of video or still images (collectively, "video"). In some embodiments, camera 212 may be at least one camera or a plurality of cameras. Camera 212 may be positioned on remote capture device 210 for the capturing of video within a selected field of view. The resolution of the video captured by camera 212 may vary, but in some embodiments, camera 212 may be configured for capturing in at least 720p resolution but may capture in higher resolution including but not limited to 1080p, 2K, 4K, or 8K resolution. However, it will be appreciated that camera 212 may be any currently known or yet to be discovered camera for capturing video. Video captured from camera 212 may be stored locally at remote capture device at a local memory 214. Local memory 214 may be any of the storage or memory described below with respect to FIG. 7. The storing of video and other sensor data at local memory 214 may aid in providing a failsafe or backup storage of captured video in the event of a transmission or upload failure. Further, the storing of video and sensor data at local memory 214 may aid in situations of poor wireless connection or if a direct line becomes loose or interrupted, preventing the immediate transmission of captured video. Optionally or additionally, video captured from camera 212 and other sensor data may be transmitted to computer 260 for processing, analyzing, storage, and/or for later transmitting to control system 280. In further embodiments, video captured from camera 212 may be directly transmitted to control system 280 for processing.

In some embodiments, remote capture device 210 may further comprise at least one three-dimensional camera 216 or other device configured for capturing three-dimensional depth information. As described in greater detail below, three-dimensional camera 216 may be utilized for capturing three-dimensional depth information within a field of view for creating a point cloud, 3-D model, or other digital representation of an object or area scanned or viewed by three-dimensional camera 216. Three-dimensional camera 216 may be operated in conjunction with, or independent from camera 212 or other components or parts of remote assembly 202 and/or remote capture device 210. As described in greater detail below, in response to instructions or an input, three-dimensional camera 216 may begin capturing three-dimensional depth information about an object or area within a field of view. Like the captured video with respect to camera 212, the three-dimensional depth information captured by three-dimensional camera 216 may be saved locally at memory 214. In some embodiments, remote capture device 210 may comprise a separate memory 214 for video captured by camera 212 and a separate memory 214 for three-dimensional information captured by three-dimensional camera 216. As described in greater detail below, remote capture device 210 may comprise a microphone 218 and/or sensor 220, which may be one or more or a plurality of sensors, for capturing additional sensory information. Accordingly, in some embodiments, a separate and distinct memory 214 may be used for each sensory capture device (i.e., camera 212, three-dimensional camera 216, microphone 218, and/or sensor 220). In further embodiments, remote capture device 210 may comprise single memory 214 for the storing of all captured sensory information. As described above and in further embodiments, three-dimensional information may be directly sent to computer 260 in addition to or instead of storing locally at memory 214.

In addition to capturing video and/or three-dimensional information, it may also be advantageous for remote capture device 210 to capture additional sensory information that may be presented to operator 120 and/or processed by computer 260 for autonomous control. For example, in certain scenarios it may be advantageous for remote capture device 210 to capture audio via at least one microphone 218. Continuing with the running example, remote assembly 202 for use with telecommunications repair may utilize audio information for diagnostic or safety purposes. For example, audio information may capture the sounds of the job site and/or aerial work environment and the audio information may be processed to determine a state of the job site. Accordingly, in some embodiments, remote capture device 210 may comprise at least one microphone 218 for the capturing of audio information. Similar to the video and three-dimensional information as described above, captured audio information may be stored locally at memory 214 and/or transmitted to computer 260 and/or control system 280.

Similar to audio information, remote capture device 210 may further comprise sensor 220 for the capturing of additional sensory information, metrics, and/or data. For example, continuing with the running example, remote capture device 210 may be used with remote assembly 202 positioned at the end of boom assembly 104 for telecommunication or powerline work on aerial power system 402 in aerial work environment 400. In such a work application, remote assembly 202 may be working on or near live powerline or other conductive lines transferring electricity. Accordingly, in some embodiments, remote capture device 210 may comprise sensor 220 configured as an electricity sensor measuring current, voltage, and/or a magnetic field for determining whether a cable or powerline has electricity running through it. However, it will be appreciated that remote capture device 210 may comprise additional sensors configured and adapted for providing remote capture device and/or remote assembly 202 with additional information. By way of non-limiting example, sensors may be sensor 220, in some embodiments, comprising any of the following sensors/devices: a gyroscope, an accelerometer, a thermometer, a barometer, a light emitter, a photodiode, a voltmeter, an ammeter, a magnetic field sensor, a strain gauge, a pressure gauge, among other sensors/devices that may be utilized in the intended application of remote assembly 202.

In some embodiments, remote assembly 202 may further comprise at least one digital hub 222. In some embodiments, remote assembly 202 further comprises at least one digital hub 222. Digital hub 222 may receive the captured sensory information from remote capture device and convert the captured sensory information into a format suitable for transmitting to computer 260 and/or control system 280. In some embodiments, digital hub 222 is a USB Hub, such as, for example, a USB 3.0, ethernet switches, and/or future advancements.

As further depicted in FIG. 2, remote assembly 202 may further comprise controller 224. In some embodiments, controller 224 may be one or more processors or other circuitry or computer hardware for receiving commands or instructions from control system 280 and/or computer 260 and for relaying or providing commands to remote capture device 210 and/or motion controls 230. Accordingly, in some embodiments, instructions or commands from controller 224 may be sent to remote capture device 210. For example, instructions sent from controller 224 to remote capture device 210 may include instructions to begin recording video via camera 212. However, it will be appreciated that instructions sent from controller 224 may cause any of the components of remote capture device 210 to begin capturing sensory information, including but not limited to three-dimensional information, audio information, or other sensory information captured by any of the sensors 220 of remote capture device 210. Additionally, controller 224 may be used to send instructions to cause remote assembly 202, remote capture device 210, and/or motion controls 230 to perform other actions corresponding to the instructions. For example, instructions from controller 224 may instruct remote capture device 210 to store captured sensory information on memory 214. Additionally, instructions from controller 224 may be sent to motion controls 230 to instruct remote assembly 202 to perform a movement. Further, controller 224 may be in communication with transceiver 244 for communicating with computer 260 and/or control system 280 to send sensory information or other data or information to computer 260 and/or control system 280. Similarly, controller 224 may further be configured for receiving instructions, commands, or other information from computer 260 and/or control system 280.

Figure 3A:
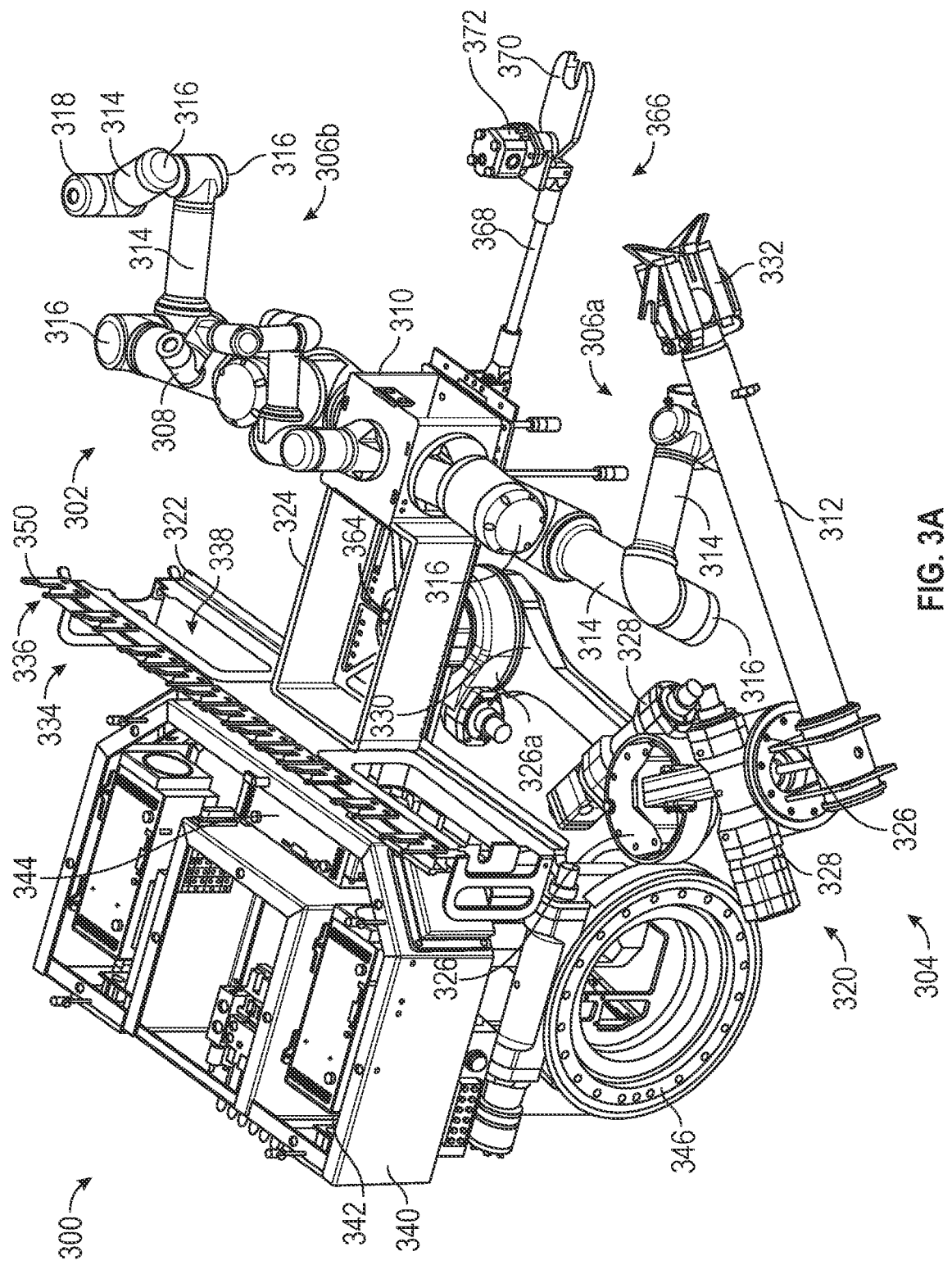
FIGS. 3A-3B depict an exemplary aerial robot system in various configuration relating to some embodiments.

As further depicted in the block diagram of FIG. 2 and in some embodiments, remote assembly 202 may further comprise motion controls 230. Motion controls 230 may be configured and adapted for controlling the movement of remote assembly 202, including any utility arms or camera mounts as described in greater detail below. In some embodiments, remote assembly 202 may comprise a 6 DOF robot unit configured with utility arms and/or camera mounts that can move with 6 DOF. Accordingly, motion controls 230 may be configured to provide instructions or commands to remote assembly 202 to move in 6 DOF. In some embodiments, motion controls may comprise x-axis control 232, y-axis control 234, z-axis control 236, pitch control 238, yaw control 240, and/or roll control 242 for moving remote assembly 202 with 6 DOF. It will be appreciated however, that remote assembly 202 may comprise varying designs, and in some embodiments, may move in fewer than 6 DOF. Accordingly, in further embodiments, motion controls 230 may comprise controls configured and adapted for moving remote assembly 202 in an appropriate number of planes. Furthermore, as shown in FIG. 3A, robot unit 302 may comprise a plurality of joints providing various locations for that may each provide 6 DOF movements.

As described above, motion controls 230 may be in communication with controller 224. Instructions or commands from controller 224 may be sent to motion controls 230. Upon receipt of the instructions, the corresponding controls 232, 234, 236, 238, 240, and/or 242 may be instructed to cause movement of remote assembly 202 based on the received instructions. As described above, one or more arms or limbs of remote assembly 202 may be configured to move with 6 DOF. Based on the instructions, the corresponding motion controls 230 may cause movement of remote assembly 202 to correspond to the instructions.

As described above, remote assembly 202 may be communicatively coupled to computer 260. In some embodiments, computer 260 may be directly coupled to remote assembly 202, such that computer 260 and remote assembly 202 are a combined system. For example, computer 260 may be directly installed into a frame or body of remote assembly 202. Accordingly, remote assembly 202 and computer 260 may be in direct communication through cables or other direct methods. In further embodiments, computer 260 may be located external to remote assembly 202. When located externally, remote assembly 202 and computer 260 may nevertheless be communicatively coupled. For example, in some embodiments, remote assembly 202 and computer 260 may be coupled through a physical connection such as a fiber optic cable, an Ethernet cable, and/or USB cable. In further embodiments, remote assembly 202 and computer 260 may be coupled through a wireless connection, such as WIFI, Bluetooth®, cellular connection, or another wireless connection. In embodiments in which computer 260 and remote assembly 202 are connected through a wireless connection, transceiver 244 may communicate with another transceiver 250 coupled or otherwise in communication with computer 260.

In some embodiments, computer 260 may receive and process sensory information captured by remote capture device 210 of remote assembly 202. Accordingly, computer 260 may comprise at least a processor 262 for executing commands, which may include instructions for processing, analyzing, or utilizing captured sensory information. For example, as described in greater detail below, computer 260 may utilize captured three-dimensional information to generate a point-cloud, three-dimensional model, or other digital representation of an object or area captured by remote capture device 210.

In some embodiments, control system 280 may be an interface, apparatus, or system providing a user with an interactive medium for interacting with computer 260 and/or remote assembly 202. For example, in some embodiments, control system 280 may comprise at least a processor 282, at least one controller 284, at least one display 288, at least one sensor 290, and at least one transceiver 292. As described in greater detail below, some embodiments of the present teachings provide for a method of controlling remote assembly 202 from a remote location. Continuing with the running example, oftentimes telecommunications repair or powerline repair sometimes occur during or immediately after a severe weather storm. This type of scenario can include dangers such as exposed and live powerlines, high winds, lightning, and other dangers that pose a risk to human workers. Accordingly, it may be advantageous for an operator of remote assembly 202 to control remote assembly 202 in a safe location, such as in a work truck or building away from the job site. Accordingly, control system 280 may comprise at least one controller 284, providing interactive systems and methods for a user to input commands or instructions for controlling or manipulating remote assembly 202.

Controller 284 may be any interface for inputting commands or instructions that can be transmitted and processed by a computer or other hardware. By way of non-limiting example, controller 284 may comprise hand-held motion control controllers (e.g., input devices 122). As described in greater detail below, the motion control controllers may be beneficial for operator 120 to perform specific movements or actions that can be captured and relayed to remote assembly 202 to perform. Through the use of motion-control controllers, operator 120 may be provided with a sensory effect similar to being at the job site and performing the actions themselves. However, controller 284 is not limited to motion controls and instead, controller 284 may be any interface (e.g., input devices 122) for operator 120 to input instructions or commands for remote assembly 202. For example, in further embodiments, controller 284, which may be input devices 122, may be a handheld controller, similar to that of a video game controller comprising thumbsticks, buttons, triggers, and/or other interfacing inputs. In further embodiments, controller 284 may comprise a joystick and button design. In even further embodiments, controller 284 may be a mouse and keyboard. In even further embodiments, controller 284 may be configured as a glove or interactive model of a hand, allowing an operator to perform native hand manipulations which may be captured and transmitted to remote assembly 202. In even further embodiments, controller 284 may comprise a camera component or other motion capture component for capturing the movement of an operator. For example, in addition to, or in place of a physical controller handled by the operator, a camera component may capture the movement of the operator. The captured movement may be transmitted to computer 260 for translation or mapping movement of remote assembly 202. Optionally, or additionally, motion capture aids, such as motion capture dots, may also be used for capturing movement of the operator. In some embodiments, it will be appreciated that the examples provided herein are intended to be illustrative, rather than limiting, and that controller 284 may be any apparatus or method of receiving instructions or an input from an operator.

In some embodiments, control system 280 may further comprise a power medium 286 for powering one or more parts or components of the control system, including for example controller 284, display 288, or the at least one sensor 290, or any combination thereof. In some embodiments, a single power medium may power all parts or components of control system 280. In further embodiments, individual parts or components of control system 280 may comprise a separate and distinct power medium 286. For example, first power medium 286 may be used for powering controller 284 and a second power medium 286 may be used for powering display 288. Power medium 286 may be any conventionally known power source for providing power to an electrical device, including but not limited to an internal power source such as a battery, or an external battery source such as an electrical outlet.

As further depicted in FIG. 2, control system 280 may further comprise at least one display 288. In some embodiments, display 288 may be a monitor, touchscreen, television screen, or other display with reference to FIG. 7 described below. In some embodiments, at least a portion of the captured sensory information from remote capture device 210 may be displayed on display 288, which may be head-up display 124 in some embodiments for operator 120 to view. For example, captured video may be displayed on display 288. Providing sensory information on display 288 may provide an operator with a more immersive feel when remotely operating remote assembly 202. Through a real-time video feed, operator 120 may experience the job site as if operator 120 was physically present, even if operator 120 is in a safe location miles away. Additionally, providing sensory information to operator 120 via display 288 may aid operator 120 in inputting instructions or commands via controller 284.

In some embodiments, control system 280 may further comprise at least one sensor 290, which may provide additional sensory affect to the operator 120 and/or capture additional inputs that may be used by computer 260 to provide instructions to aerial robot system 300. In some embodiments, one or more sensors may be combined with controller 284 and/or one or more sensors may be combined with display 288. For example, in some embodiments, sensor 290 may be at least one speaker or sound emitting device to provide operator 120 with audio information captured from remote capture device 210 or pre-recorded or pre-rendered audio. In further embodiments, the at least one sensor 290 may be one of an accelerometer, a gyroscope, a light sensor, or any other type of sensor 290 suitable to detect the viewing angle of the user or the movement, position, or angle of the operator's body.

In some embodiments, and as described in greater detail below, operator 120 may utilize controller 284, display 288, and the at least one sensor 290 to provide instructions to remote assembly 202, which may be analyzed and translated into instructions to cause remote assembly 202 to move or perform an action. As also described in greater detail below, operator 120 may input instructions or commands through control system 280, which may be input devices 122. In some embodiments, inputs may be inputted or captured by a combination of controller 284 and display 288. For example, display 288 may be coupled to a head-mounted unit (e.g., head-up display 124) as described in greater detail below. Operator 120 may move their head or torso with sensor 290 capturing the movement and/or viewing angle of operator 120. The captured movement data or viewing angle may be sent to computer 260 via transceiver 292, and computer 260 may take the captured movement data or viewing angle and translate into instructions for causing remote assembly 202 to move and mimic or replicate the operator's movement and match the viewing angle of the operator.

Figure 3B:
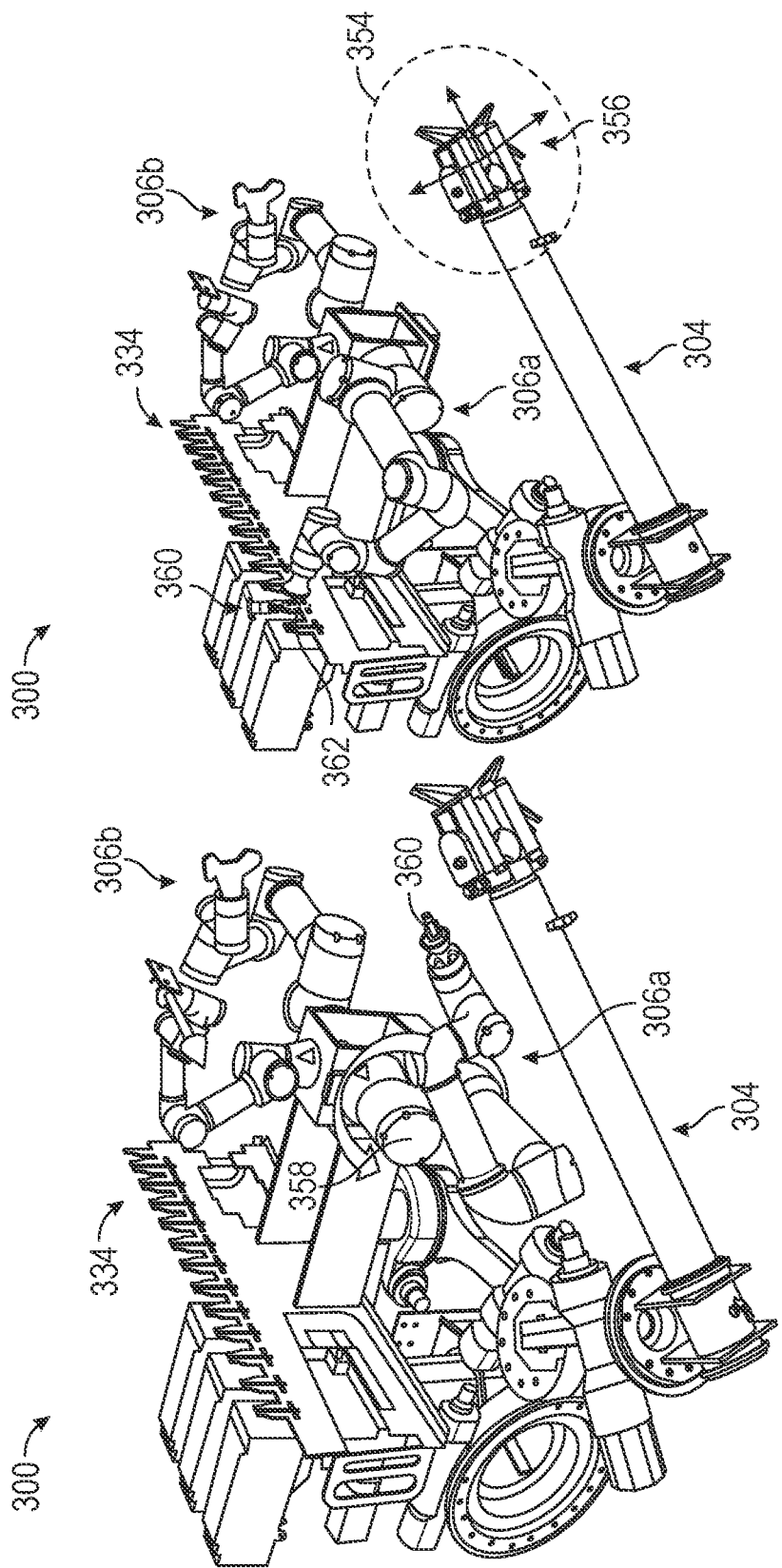

FIGS. 3A-3B illustrate an exemplary aerial robot system 300 comprising robot unit 302 and a high-capacity manipulator or auxiliary arm 304 in accordance with embodiments of the present disclosure. As shown, robot unit 302 may comprise first utility arm 306a, second utility arm 306b, and a camera mount 308, in some embodiments comprising camera 212. In some embodiments, utility arms 306a, 306b may be configured to perform work operations, such as removing and installing parts (e.g., insulators) on a utility pole. In some embodiments, camera mount 308 is a camera-supporting robotic arm to which camera 212 is coupled and that provides operator 120 a view of the remote location as if operator 120 was themselves in the remote location. Utility arms 306a, 306b and camera mount 308 may be coupled to central hub 310. Central hub 310 may have dimensions approximating a human torso such that utility arms 306a, 306b extend off opposite lateral sides of central hub 310 to mimic the arms of operator 120, while camera mount 308 may extend off a top surface of central hub 310 to mimic the head of operator 120, thereby allowing operator 120 to operate robot unit 302 in a manner that mimics that operator 120 was in the remote location performing the energized power line work.

As described above, robot unit 302 may be adapted for performing repair work, maintenance work, or other similar situation, tasks, or actions. To perform these actions, robot unit 302 may comprise at least one utility arm generally references as utility arms 306a, 306b. Like camera mount 308 as described above, each of utility arms 306a, 306b may comprise a plurality of utility arm segments 314 that may be separated by pivotable joints 316, which may be motorized. The number and size of utility arm segments 314 and pivotable joints 316 may vary depending on the embodiments and application of robot unit 302. Generally, in response to an instruction or commands, one or more of pivotable joints 316 may activate to rotate or move utility arms 306a, 306b. In some embodiments, the pivotable joints 316 may be used to move utility arms 306a, 306b in the X-axis, Y-axis, Z-axis as well as control the roll, pitch, and yaw of utility arm 306a, 306b. Accordingly, through movement in the 6 DOF, each utility arm 306a, 306b may mimic or replicate the movement of arms and hands of operator 120.

In some embodiments, the distal ends 318 of utility arms 306a, 306b may comprise one or more tools, flanges, or other apparatus for performing an action such as repair work. In some embodiments, distal ends 318 may comprise an adapter or may be otherwise configured for accepting a tool. The tool exchange is described in more detail below and illustrated in FIGS. 4C-4D.

In some embodiments, aerial robot system 300 may comprise auxiliary arm 304. Auxiliary arm 304 may work in or near the same lateral plane as utility arms 306a, 306b. Providing an exemplary jib 312 in such a side-by-side configuration with utility arms 306a, 306b, may reduce the overall envelope of aerial robot system 300 as compared to an over-the-top arm. That is, robot unit 302 and auxiliary arm 304 in a side-by-side configuration may be maneuverable through tight spaces (e.g., between phases of aerial power system 402) because the height of aerial robot system 300 is reduced.

In some embodiments, robot unit 302 may be supported, or disposed on and coupled to platform 322. Furthermore, auxiliary arm 304 may be coupled to platform 322 by coupling assembly 320. Platform 322 may provide a frame for supporting the other components of aerial robot system 300. That is, platform 322, in some embodiments, provides a structural framework connecting all components of aerial robot system 300 to boom assembly 104. In some embodiments, platform 322 may be coupled to pivot joint 346.

As shown, pivot joint 346 may comprise a slew drive system actuatable to maintain a level configuration of aerial robot system 300. For example, sensors 290 may comprise an inertial measurement unit (IMU) comprising accelerometers, gyroscopes, and the like. The sensor data may be obtained and processed by remote assembly 202 and output slew drive commands to maintain a level configuration of aerial robot system 300 relative to a measured gravity vector. In this way, aerial robot system 300 may maintain a level configuration.

In some embodiments, coupling assembly 320 may connect auxiliary arm 304 to an underside of robot unit 302, platform 322 (e.g., structure frame) below a receptacle 324 (discussed further below). Coupling assembly 320 may comprise linkages, joints (e.g., pivot joints), and the like to connect auxiliary arm 304 to platform 322 further supporting robot unit 302. In some embodiments, coupling assembly 320 may comprise auxiliary actuators 326, which, in some embodiments, may be slew drives (as shown), a rotator linkage, linear actuators, and the like. In some embodiments, coupling assembly 320 is configured to provide auxiliary arm 304 with one-, two-, three-, four-, five-, or six-degrees of freedom. Auxiliary actuators 326 may be actuated by motors 328 providing movement to auxiliary linkages 330 and auxiliary arm 304. Auxiliary commands to control the movement of auxiliary actuators 326 may be provided by operator 120 utilizing input devices 122 and/or automated controllers based on automated algorithms described herein.

Auxiliary arm 304 may also comprise end effector 332, which may be interchangeable with other end effectors such that an appropriate end effector may be selected based on the work task to be performed. For example, as shown below in FIGS. 4A-4B, end effector 332 may be a vise (or other coupler) that couples to an energized phase 408 to electrically bond robot unit 302 to the energized phase 408 for performing maintenance work on energized components of the aerial power system 402. Auxiliary arm 304 may further be configured to, for example, move phase 408 out of the way of robot unit 302 while robot unit 302 performs work on other power line components.

In some embodiments, robot unit 302 may comprise tool rack 334 and parts holder 338. Tool rack 334 may store tools that are usable by utility arms 306a, 306b for operating on aerial power system 402 in aerial work environment 400 and may include pin pullers (e.g., for decoupling a pinned connection as discussed further below), gripper tools for grabbing an object, and any other tools generally used in aerial line maintenance and repair that are adapted to connect to utility arms 306a, 306b, and/or auxiliary arm 304. In some embodiments, utility arms 306a, 306b may be configured to automatically retrieve tools from tool rack 334 and put away tools into tool holders 336. For example, responsive to receiving an instruction to retrieve or store a tool, aerial robot system 300 may automatically perform the instructed action without requiring any further input from operator 120. Tool rack 334 is discussed in more detail below.

In some embodiments, parts holder 338 may hold parts that aerial robot system 300 may use during a work operation in work environment 400, such as parts to be installed onto a utility pole. For example, parts holder 338 may hold an insulator that may be automatically retrievable by utility arms 306a, 306b for installation onto the utility pole. Parts holder 338 is discussed in more detail below.

In some embodiments, aerial robot system 300 further comprises utility box 340. Utility box 340 may be disposed on and coupled to platform 322. As such, utility box 340 may rotate along with platform 322 by pivot joint 346 described above. Utility box 340 may provide a housing configured to contain power systems 342 as well as sensors and computing hardware systems described below and illustrated in FIG. 7. As such, utility box 340 may provide all power, electrical, hydraulic, and pneumatic systems necessary to carry out the processes described herein.

Power system 342 which may be batteries, motors generating hydraulic, pneumatic, electric, and mechanical energy, and the like. Any power system that may be necessary in carrying out the descriptions herein may be power system 342. Furthermore, electronics package 344, which in some embodiments, may comprise the hardware system of FIG. 7 as well as any sensors and controllers described herein may be housed in or communicatively connected to electronics package 344 of utility box 340.

In some embodiments, aerial robot system 300 may comprise alternate auxiliary arm 366. Alternate auxiliary arm 366 may extend from a front side of robot unit 302 coupled to platform 322 below central hub 310. In some embodiments, alternate auxiliary arm 366 may provide a known length that operator 120 may use as a reference when controlling aerial robot system 300 to approach energized components in aerial work environment 400. Furthermore, alternate auxiliary arm may comprise components such as, shaft 368, implement 370, and auxiliary actuator 372 to perform operations. Alternate auxiliary arm 366 is discussed in more detail below and illustrated in FIGS. 5A-5B.

Aerial Work Environment and Operation

Turning now to FIG. 3B, in some embodiments, auxiliary arm 304 may be disposed below receptacle 324 and configured to be extended next to robot unit (e.g., in a side-by-side configuration). The side-by-side configuration may provide a low vertical profile such that aerial robot system 300 may fit between upper and lower phases in aerial work environment 400. In some operational scenarios, utility vehicle 102 may only be able to park on a single side of power lines of aerial work environment 400. Therefore, it may be difficult, in some aspects, to access both sides of the power lines. As aerial robot system 300 in the side-by-side configuration can fit between phases of typical power line systems, aerial robot system may access all phases and all components of the typical power line systems.

In some embodiments, a "minimum distance" may represent a distance necessary to prevent arcing from an energized aerial component of aerial power system 402 to aerial robot system 300. The minimum distance may be based on the expected electrical energy in the aerial component and may be defined by regulatory and safety agencies. In some embodiments, exemplary minimum distances may be approximately fifteen inches from phases to phase, or energized component to energized component, and nine inches from phase to ground, or energized component to ground. In some embodiments, sensor 220 may be used to detect a distance between components of aerial robot system 300 and power lines. Sensor 220 may be configured to detect electric energy in the form of an electric and/or magnetic field propagated by aerial power system 402. Furthermore, sensor 220 may be disposed on robot unit 302, auxiliary arm 304, and/or alternate auxiliary arm 366. For example, sensor 220 may be disposed at implement 370 and may detect an electromagnetic field, current, voltage, or the like. In some embodiments, a location of robot unit 302 and any components (e.g., utility arms 306a, 306b) may be detected by the various cameras and sensors described above. Therefore, the distance between any component of aerial robot system 300 and aerial power system 402 may be known and controlled.

In some embodiments, virtual fence 354 comprising a no-go boundary around any or all components of aerial robot system 300 may be generated. Virtual fence 354, as illustrated, represents the minimum distance described above as a threshold distance. In some embodiments, virtual fence 354 may be the threshold minimum distance moving in conjunction with a coordinate system of the corresponding component. For example, auxiliary arm coordinate system 356 may be positioned relative to auxiliary arm 304 such that, as auxiliary arm 304 moves through an inertial coordinate system, auxiliary arm coordinate system 356 moves accordingly. Furthermore, as virtual fence 354 is positioned in auxiliary arm coordinate system 356, virtual fence 354 moves along with auxiliary arm 304. In some embodiments, virtual fences 354 may be defined in the global reference frame. As such, any movement of boom assembly 104 and/or auxiliary arm 304 results in updating virtual fences 354 to remain positioned around the associated components. Any number of virtual fences may be applied to any components of aerial robot system 300. As such, all components may maintain a minimum distance between any other components as well as aerial components of aerial power system 402.

In some embodiments, aerial robot system 300 components (e.g., utility arms 306a, 306b and auxiliary arm 304) may be controlled such that virtual fences 354 do not intersect preventing the aerial robot system 300 components from colliding. An interlock may be set such that the minimum distance is maintained automatically. Furthermore, in some embodiments, visual, audible, and/or haptic feedback may be provided to an operator when virtual fences 354 of components are close or come in contact. For example, inputs devices 122 may shake or may provide resistance to movement to indicate that the aerial robot system components are close or are moving toward one another.

In some embodiments, aerial robot system 300 components may be controlled to not intersect aerial components of aerial power system 402 unless otherwise allowed to do so (e.g., when working on the components and/or when aerial robot system 300 is bonded onto aerial power system 402). The virtual fences 354 may be based at least in part on the power of the energized aerial components as well as the geometry of the corresponding remote aerial components.

Figure 5A:
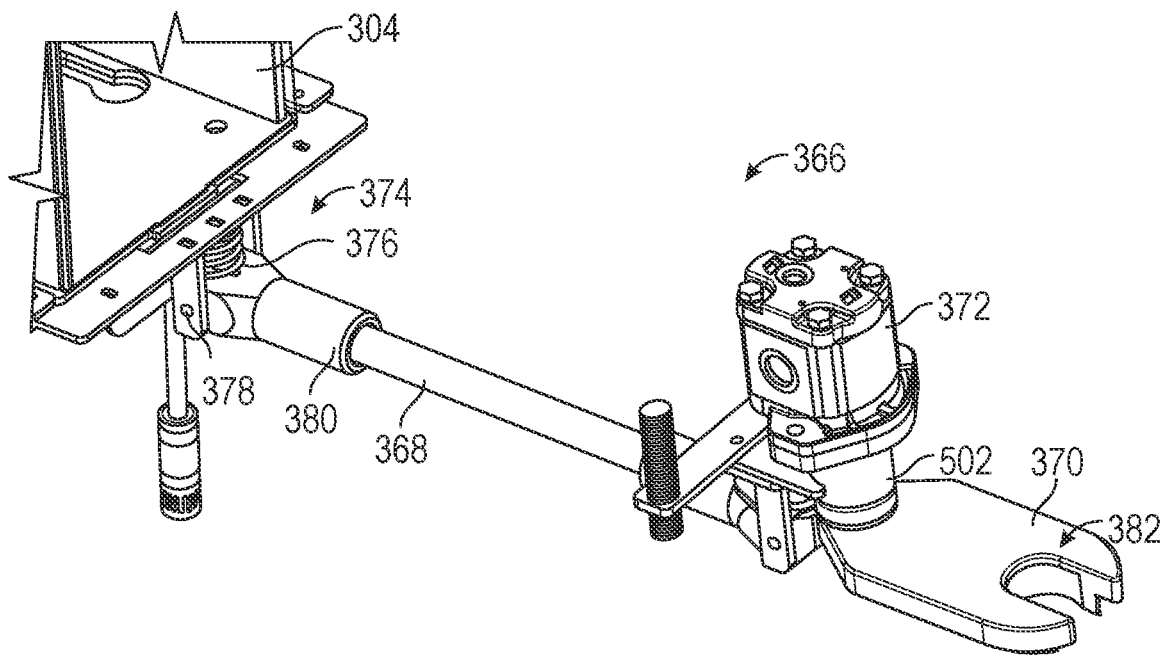
FIGS. 5A-5B depicts an exemplary auxiliary arm for some embodiments.

In some embodiments, locations of virtual fences 354 may be placed based on the geometry of the component of which virtual fences 354 is protecting. Virtual fences may be placed at a center point or a specifically defined point on a component. For example, a center of virtual fence 354 may be placed at a center point or an end of implement 370, or at a shaft end of shaft 368 (FIG. 5A). Virtual fence 354 may be placed at any point on any component of robot system 300 for protecting each component of robot system 300 from unwanted contact with other components of robot system 300 and from unwanted contact with components of aerial power system 402.

In some embodiments, virtual fences 354 may be placed based on a known location of each of the components to which virtual fences 354 are placed. These locations may be provided by sensors on the components (e.g., GPS, RFID, BLUETOOTH, and the like) and by other sensors (e.g., cameras, LiDAR, radar, and the like) of robot system 300. Additionally, in some embodiments, the locations of electrically charged, insulated, and not electrically charged components may be known or determined. For example, an insulated rod (e.g., utility arms 306a, 306b, auxiliary arm 304, alternate auxiliary arm 366, or any additional auxiliary arm) may be used to touch locations of energized or deenergized components of the power line in order to determine the positions of the virtual fences. For instance, to specify where an insulator is located in the real world, operator 120 may touch the top and bottom of any insulator with the insulated rod and the location of top and bottom may be labeled and stored. This process may be performed for determine locations of any components in aerial work environment 400.

In some embodiments, aerial robot system 300 indicate components in the aerial work environment 400 and locations on the components where locations are desired or necessary by a GUI provided to operator 120. Operator 120 may then control insulated rod to touch the components and stored the locations. Furthermore, in some embodiments, labels may be created, or the components may otherwise be classified as, energized and deenergized components. In some embodiments, insulated rod may comprise a sensor, as described above, for detecting if the components are energized. As the location information, component information, and electrically energized information may be stored for each component and boom tip 112, each component location may be tracked. Additionally, all components of aerial robot system 300 as well as aerial power system 402 may be maintained at a minimum threshold distance between charged and noncharged components by the virtual fences described herein.

In some embodiments, forward kinematics data may be used to determine a state of aerial robot system 300 as well as location determination and tracking aerial power system 402 components. Forward kinematics data may be indicative of positions, velocity, and acceleration of boom assembly 104 joints and sections. Boom sensors comprising linear and rotational sensors may detect positions, velocities, and accelerations (e.g., relative to gravity and/or movement) of components of boom assembly 104. As such, a state of boom assembly 104 and boom tip 112 may be known over time. Therefore, the boom tip 112 and aerial robot unit 300 may be controlled to a position in a coordinate system utilizing forward kinematics. The data associated with the forward kinematics movement of boom assembly 104, boom tip 112, and aerial robot unit 300 may be used to determine positions in the coordinates system (e.g., inertial coordinates system) or associated coordinates systems (e.g., boom-tip-centered, aerial-robot-centered, auxiliary-arm-centered, tool-centered, coordinate systems, or the like).

In some embodiments, controllers (e.g., linear, nonlinear, adaptive, and any other type of controller) may be used to control the aerial robot system 300 components in automated modes. When virtual fences 354 interact, or are close to interacting, the aerial robot system 300 components may slow, and the visual, audible, and/or haptic feedback described above may be provided. As such, the velocity may be controlled as well as the position. For example, third order linear proportional and/or integral and/or derivative (PID) controllers may be utilized. Furthermore, in some embodiments, fourth order PID controllers may be implemented to minimize uncommanded inputs such as wind gust oscillations and jerk.

In some embodiments, robot unit 302 may be configured and/or operated in conjunction with auxiliary arm 304 to perform coordinated and cooperative tasks to complete the aerial work. Utility arms 306a, 306b, and/or auxiliary arm 304 may be placed into a specific configuration before tasks are performed. For example, as illustrated in FIG. 3B, right shoulder 358 may be rotated from a shoulder down configuration (left image) to a shoulder up configuration (right image) to exchange tool 360. As shown, tool 360 is couple to first utility arm 306a in the left image and coupled to tool rack 334 in the right image. The shoulder up/shoulder down configuration may be an automated configuration for exchanging tools with first utility arm 306a while a shoulder-down/shoulder-up configuration may be an automated configuration for exchanging tools with second arm 306b. In some embodiments, shoulder down configuration may be utilized when utility arms 306a, 306b are in front of robot unit 302 performing work on aerial power system 402 and shoulder up configuration may be utilized when utility arms 306a, 306b are performing work behind robot unit 302, such as disposing of waste and exchanging tools 360.

As illustrated in FIG. 3B the shoulder-up configuration of first utility arm 306a provides access to tool rack 334. Any tool may be placed into tool rack 334 using tool coupler 362 which may slide between prongs 350 of tool holders 336. In some embodiments, tool holders 336 may simply comprise prongs 350 that receive the tools as shown in FIG. 3A. In some embodiments, the prongs 350 of tool holders 336 may flex to receive the tools or may slide along a rod with resistance provided by a spring to receive and hold tool at tool coupler 362. In some embodiments, the prongs 350 of tool holders 336 may move by an electromechanical actuator to open to receive the tool coupler 362 and close when the tool coupler 362 is placed between the prongs 350 to hold the tools while not in use. Furthermore, in some embodiments pneumatic-cylinder cams may lock the tools into a robot flange and/or tool holders 336.

As shown, tool rack 334 is linear such that all tools may be accessible by utility arms 306a, 306b, and auxiliary arm 304. In some embodiments, tool rack 334 may be an arc, or may be provided in a circular orientation, such as a carousel, an arc, or may be any other configuration. In some embodiments, the tasks may be automated, or user controls may be blocked before the robot unit 302 and/or auxiliary arm 304 are in the correct configuration before operator 120 is allowed to move some components of aerial robot system 300. Furthermore, the various shoulder up and shoulder down configurations may be automated and maintained by various controllers for performing various tasks by utility arms 306a, 306b, and auxiliary arm 304 as discussed in embodiments below.

Figure 4A:
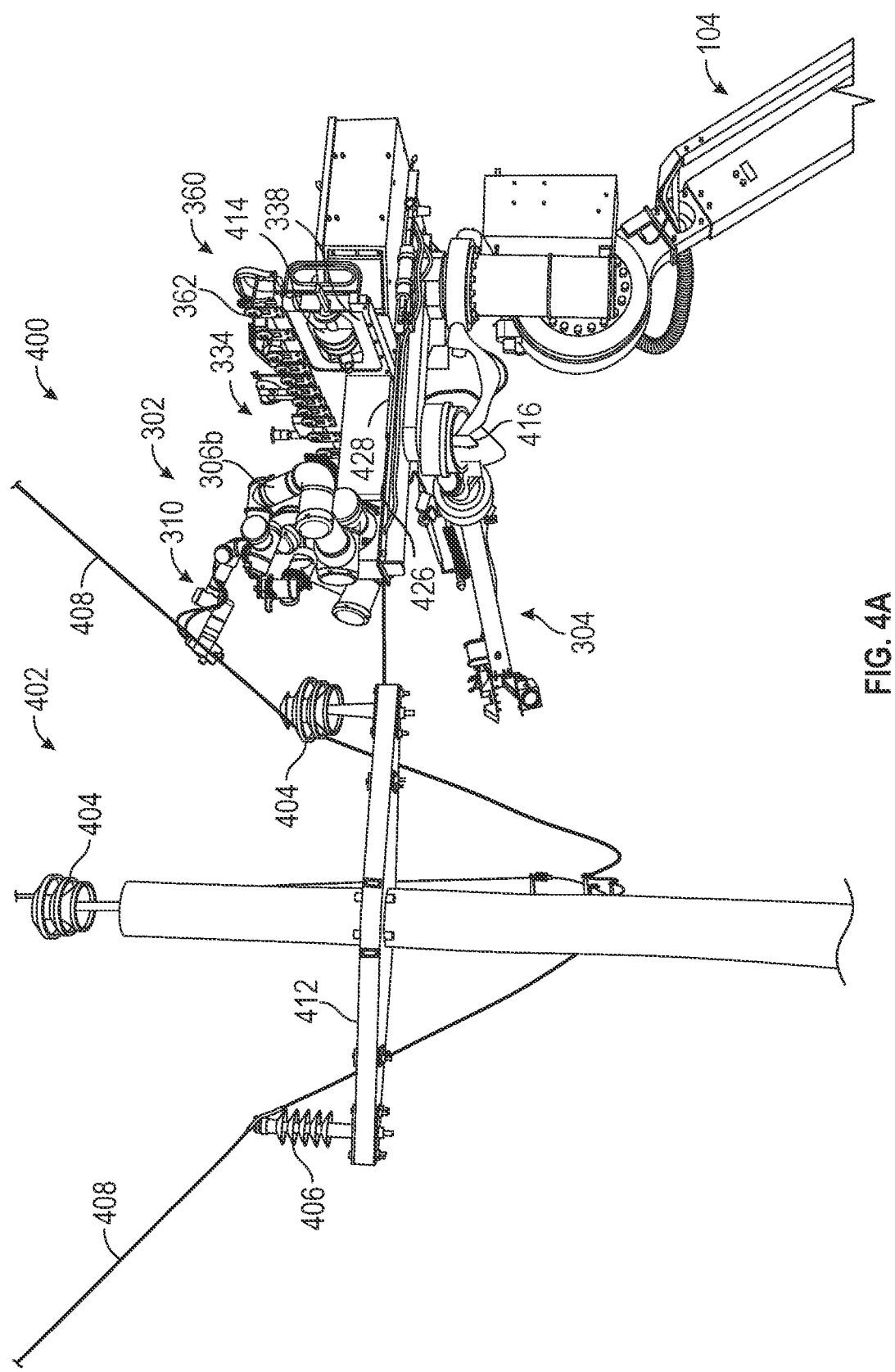
FIGS. 4A-4D depict the exemplary aerial robot system performing work in an aerial work environment.

Turning now to FIG. 4A, aerial robot system 300 is illustrated as working on phase 408 in aerial work environment 400. As shown, phase 408 is attached to insulator 404, which, in some embodiments, may be pin insulator 406 or the suspension insulator shown in FIG. 4B. For example, in some embodiments, the suspension insulator may be configured to be placed in a horizontal orientation. Insulator 404 is representative of any insulator and/or component that may be manipulated in aerial work environment 400. In this exemplary scenario continuing throughout FIGS. 4A-4D, the objective is to replace insulator 404 with new insulator 414. Aerial robot system 300 may be raised to aerial work environment 400 by boom assembly 104. Raising aerial robot system 300 to aerial work environment 400 may be controlled by operator 120 or autonomously based on waypoint coordinates and/or object recognition analysis. Tools 360 for replacing insulator 404 may be stored on tool rack 334 and new insulator 414 may be stored in parts holder 338. As such, all necessary tools and parts may be accessible by robot unit 302 and auxiliary arm 304 in aerial work environment 400.

Once aerial robot system 300 has arrived at aerial work environment 400, aerial work environment 400 may be assessed by the object recognition algorithms and by operator 120 utilizing cameras, as described above. In some scenarios, old parts disposed on aerial power system 402 may be worn out, broken, and/or may present unexpected problems and may be in need of replacement. As such, aerial robot system 300 may be prepared for unknown issues. For example, object recognition machine learning algorithms may be trained on many different types of parts from various historical manufactures. Furthermore, control algorithms may be adaptive to the various types of parts and obstacles that may be encountered during removal of the various aerial components of aerial power system 402. As such, autonomous removal may be performed if the recognition is performed to a probability above a predefined threshold value and if that recognition is associated with a stored control algorithm for removing the part. If the recognition analysis does not associate a removal algorithm or does not recognize the parts above the probability threshold, removal of the part may be diverted to operator 120 to perform the tasks. Alternatively, operator 120 may recognize the issue and take control of aerial robot system 300 to remove the part. In some embodiments, removal of the part is left to the operator and no recognition analysis is performed.

In some embodiments, prior to the initiation of work, virtual fences 354 may be provided to each part of robot system 300 that will be in proximity to other parts and to components of aerial power system 402. As such, before work begins, all components of robot system 300 are protected from unwanted discharge and incidental contact.

Figure 4B:
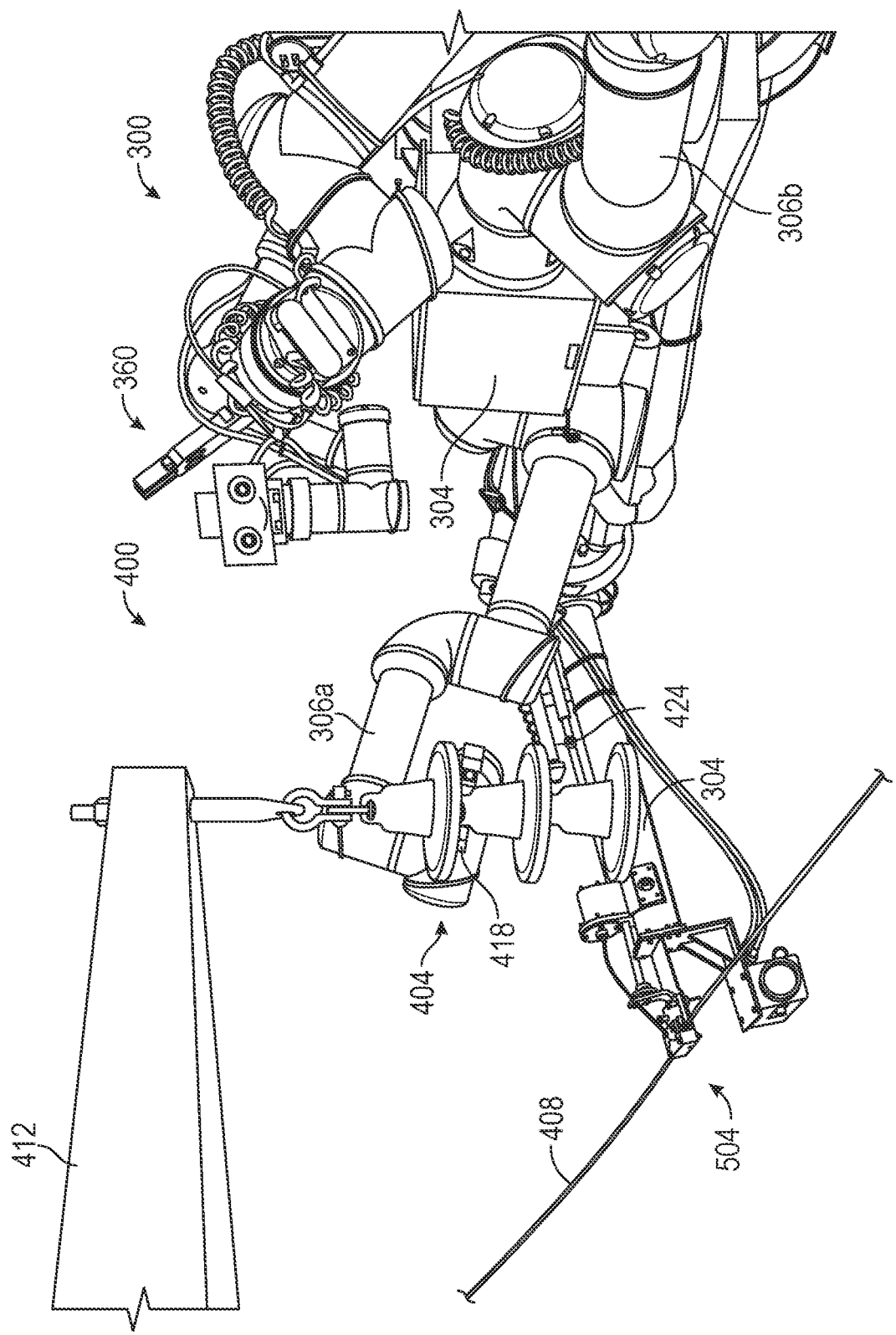

In some embodiments, as depicted in FIGS. 4A-4B specialized tools 360 may be used to couple to manipulators located at a distal end of each of utility arms 306a, 306b and auxiliary arm 304. For example, insulator 404 may be adapted to provide a long rod portion for ease of gripping by high-dexterity clamp 418. Furthermore, insulator 404 may be fashioned with ring bolts such that robot unit 302 may utilize high-dexterity clamp 418 for grabbing and rotating. Furthermore, tools 360 may comprise various hot-stick tools, which may be adapted to couple to the manipulators (e.g., utility arms 306a, 306b, and auxiliary arm 304) to provide ease of use. Hot-stick ring tools may be provided in various sizes to be used in tie-wire wrapping and unwrapping and hot line hooks may be used to simplify snagging a cable. Similar to high-dexterity clamp 418, a 4-bar linkage gripper may be adapted or configured to be coupled to manipulators providing high-capacity gripping. Further, a phase cutter (not shown) may be modified to couple to utility arms 306a, 306b and/or auxiliary arm 304. Furthermore, a clamp, tool adapter, and manipulator adapter may be used to couple tools 360 to the manipulators and to various tool holders when tools 360 are not in use as described above.

Figure 5B:
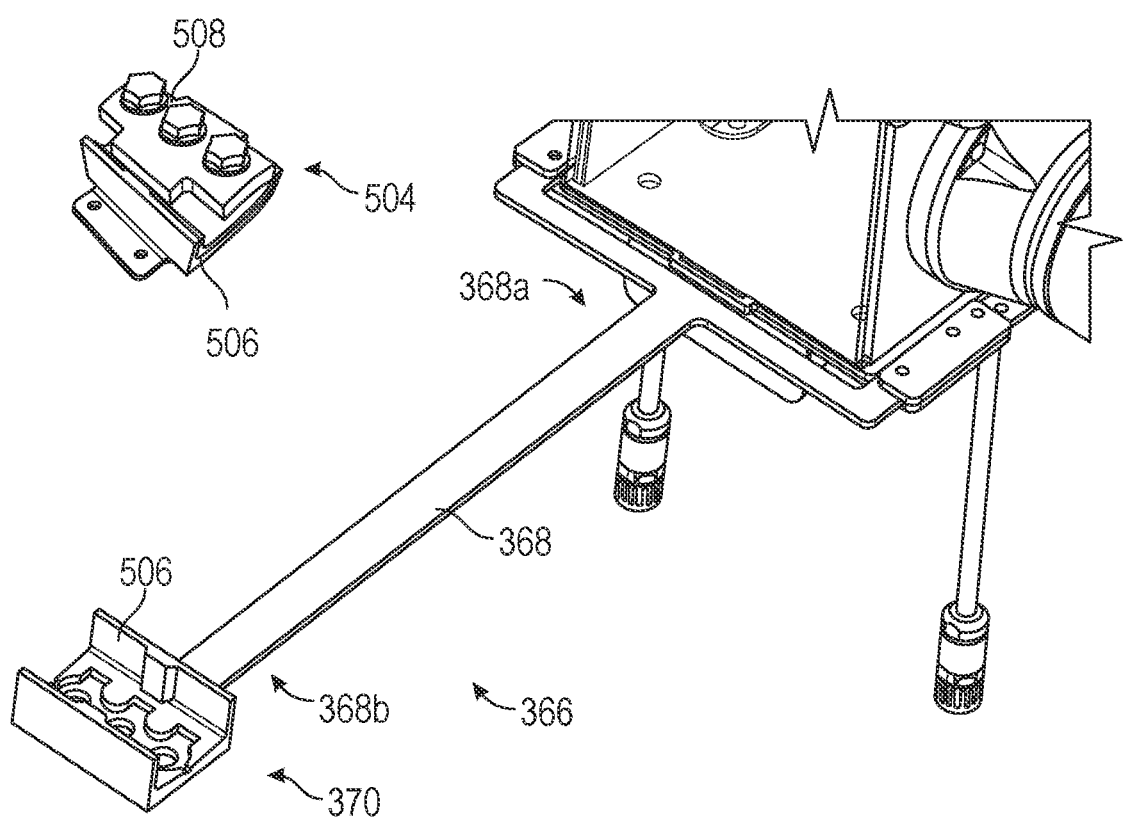

Here, high-dexterity clamp 418 may be clamped onto insulator 404 while auxiliary arm 304 is coupled to phase 408 by one of the various tools 360 (e.g., vice 504, FIG. 5B). Auxiliary arm 304 may hold phase 408 while robot unit 302 removes insulator 404 from crossmember 412. Various tools may be necessary for this task, and robot unit 302 may exchange tools 360 as needed by placing disposing tools onto tool rack 334 and removing other tools from tool rack 334. Furthermore, auxiliary arm 304 may bond onto aerial power system 402 by bonding unit 424. Further details of the bonding onto energized power lines may be found in commonly-owned U.S. application Ser. No. 18/396,009, titled "AUTOMATIC BOND ON TO ENERGIZED POWER LINE FOR REMOTE OPERATIONS" the entirety of which is incorporated by reference herein.

In some embodiments, operator 120 may control robot unit 302 and auxiliary arm 304 to remove an aerial component (e.g., insulator 404) that needs to be replaced. Continuing with the exemplary embodiment described above, operator 120 may control auxiliary arm 304 to grasp and bond to phase 408 and control utility arms 306a, 306b to remove nuts, bolts, and tie wires, to remove phase 408 from insulator 404 and to remove insulator 404 from crossmember 412. Removal of insulator 404 may be performed by operator 120, automatically by preprogramed control algorithms, or by a combination of the two. For example, as shown in FIG. 4B, insulator 404 may be held by first utility arm 306a using high-dexterity clamp 418 while auxiliary arm 304 holds phase 408 and second utility arm 306b may remove wire ties to release insulator 404 from phase 408. Once phase 408 is released, second utility arm 306b may remove nuts and bolts utilizing a ratchet and drill tool (not shown) to release insulator 404 from crossmember 412.

Figure 4C:
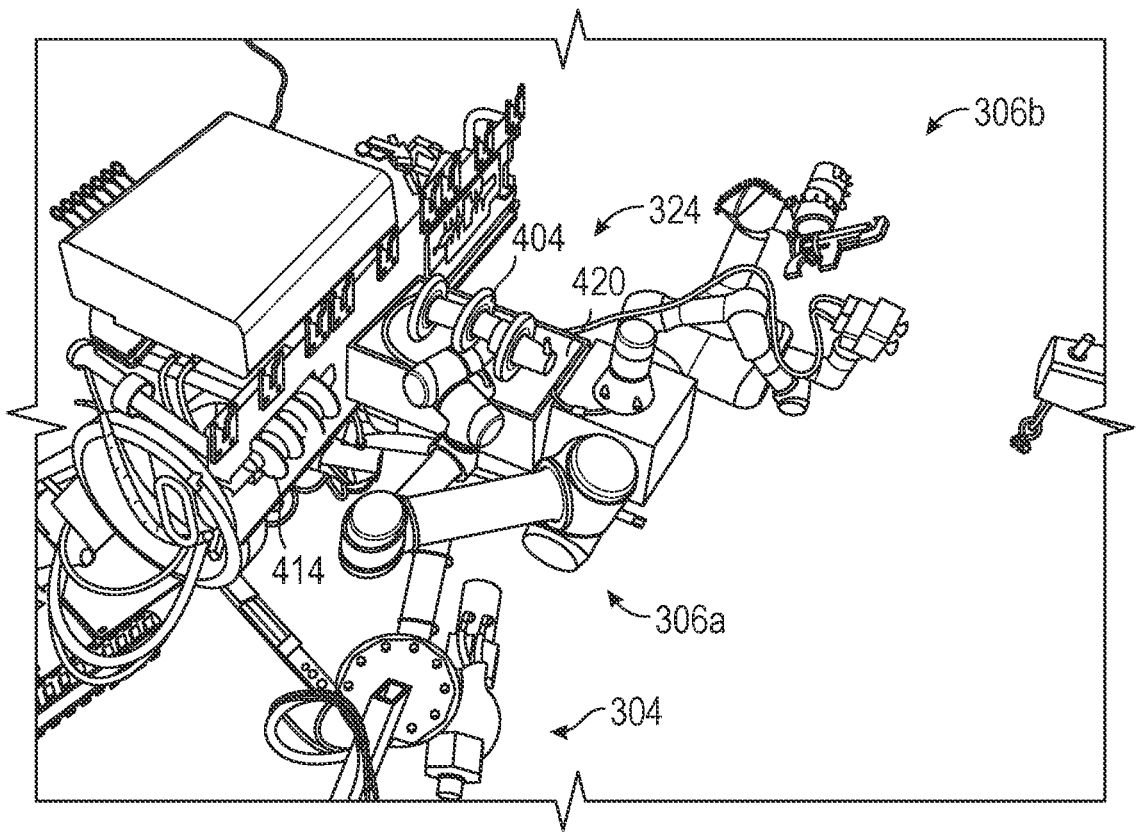

After insulator 404 has been removed from crossmember 412, operator 120 may manually control first utility arm 306a to rotate to the shoulder-up configuration to dispose insulator 404 into receptacle 324 as shown in FIG. 4C. In some embodiments, operator 120 may input a code corresponding to an automated mode or otherwise select the automated mode by input devices 122. In some embodiments, the automated mode may be based on the location of the receptacle and the type of aerial component (e.g., insulator 404). The automated mode may process a series of commands controlling first utility arm 306a to dispose insulator 404 into receptacle 324 as shown.

In some embodiments, receptacle 324 may be disposed behind robot unit 302 and configured to receive waste including wire ties, nuts, bolts, insulators, and the like. Receptacle 324 may comprise a box as shown, which may be any shape including square, rectangular, circular, elliptical, cubic, spherical, ovoidal, and the like. Furthermore, in some embodiments, insert 420 may be placed inside receptacle 324. Insert 420 may be configured to protect the interior of receptacle 324 and the aerial component (e.g., insulator 404) placed into receptacle 324. Insert 420 may comprise plastic, rubber, fabric, and the like.

In some embodiments, receptacle 324 may be positioned on platform 322 as shown in FIGS. 3A and 4A directly over auxiliary actuator 326a but attached to platform 322 at receptacle attachment point 426 leave a non-connected portion cantilever portion 428 where receptacle is not attached to platform. Receptacle 324 may only be attached ahead (on the robot unit side) of an attachment point of auxiliary arm 304 to platform 322 at first auxiliary actuator 326a. For repeatable tool exchange, robot unit 302 and tool rack 334 may move together. As such, tool rack 334 may be coupled to receptacle 324 coupled to platform 322 ahead of first auxiliary actuator 326*a*. Therefore, when a load is applied to auxiliary arm 304 and the load is translated to platform 322 through first auxiliary actuator 326*a*, any deformation of platform 322 occurs behind receptacle attachment point 426 and does not affect the relative location of tools 360 to robot unit 302. The relative location between tools 360 on tool rack 334 and robot unit 302 insures consistent and repeatable tool exchange as well as waste disposal. In some embodiments, receptacle 324 may be attached to platform 322 at any point or continuously. In some embodiments, receptable 324 and tool rack 334 may not be coupled and tool rack 334 may be coupled to platform 322 either directly or indirectly through a coupling mechanism.

Furthermore, in some embodiments, a hole 364 (FIG. 3A) may be provided in the interior floor of receptacle 324 such that parts larger than the interior size of receptacle may be disposed in receptacle 324 and features of the parts may extend into hole 364 (e.g., the pin of pin insulator 406). For example, pin insulator 406 may be inserted such that the pin of the pin insulator 406 is received in hole 364. Therefore, pin insulators may be inserted vertically into receptacle 324. To prevent smaller parts and disposable objects, such as wire ties, nuts, bolts, and the like, from falling through the hole, secondary receptacle 416 (FIG. 4A) may be inserted into hole 364 such that any smaller objects are caught and do not fall through hole 364. Secondary receptacle 416 may comprise any necessary shape to be placed into hole 364 including, a cone, square, rectangle, triangle, or any other irregular shape that may be useful in filling hole 365 and catching smaller objects. Furthermore, hole 364 centerline may be aligned with a centerline of auxiliary actuator 326*a*. This minimizes the overall profile of aerial robot system 300.

Figure 4D:
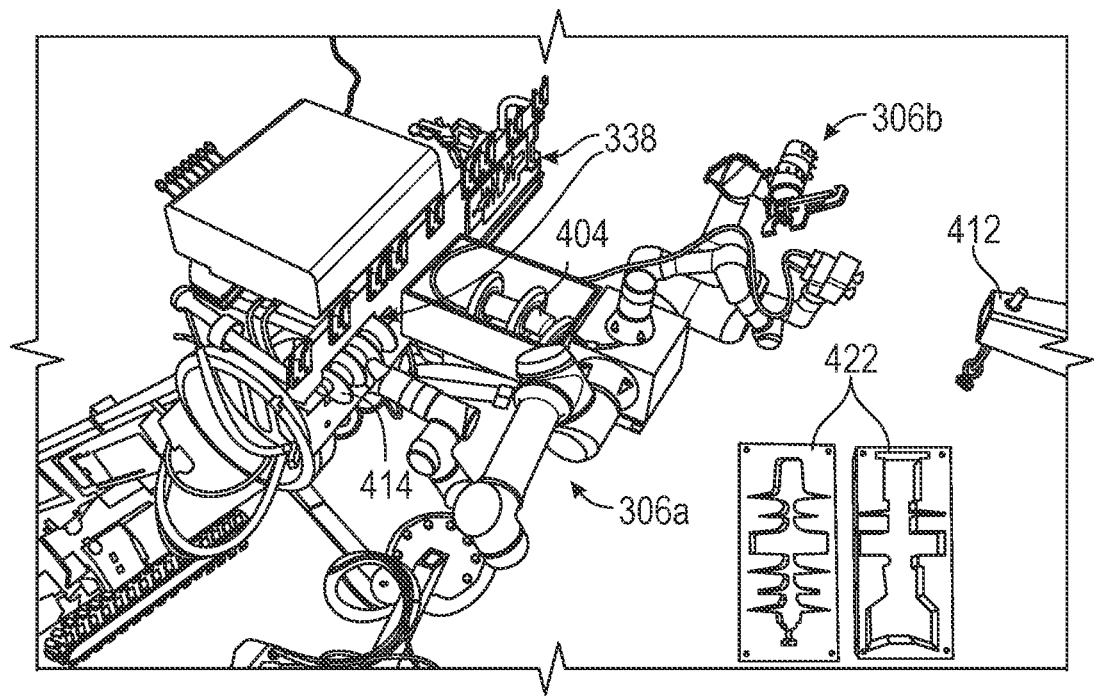

FIG. 4D depicts first utility arm 306*a* grasping new insulator 414 disposed in part holder insert 422 in parts holder 338. In some embodiments, after placing insulator 404 into receptacle 324, first utility arm 306*a* may retrieve new insulator 414 from parts holder 338. Parts holder 338 may comprise part holder insert 422. This process may be automated or performed by operator 120 as described in more detail below. Here, part holder insert 422 comprises a foam material formed or cut to hold new insulator 414. Part holder insert 422 may be formed or cut to hold any part for replacement of aerial components such as, for example, insulators, conductors, nuts, bolts, spacers, and the like. Part holder insert 422 may comprise any material such as, for example, foam, rubber, plastic, fabric, metal, composite, or any other material that may hold the corresponding part in a repeatable location for automated retrieval. In some embodiments, parts holder 338 may comprise spring operated holders and/or electromechanical actuators for securing parts in parts holder 338.

In some embodiments, parts holder 338 may be set at an angle to reduce or eliminate the possibility of the part and/or part holder insert 422 from falling out. For example, parts holder 338 may be set at a 10-20-degree angle with a first side facing the robot for receiving parts higher than a second side opposite the first side. As such, gravity would aid in holding any parts disposed in parts holder 422 in place.

In some embodiments, operator 120 may manually control first utility arm 306*a* to retrieve the replacement part (e.g., new insulator 414). In some embodiments, operator 120 may initiate an automated sequence to retrieve the replacement part. In some embodiments, the automated retrieval algorithm may be an extension of the waste disposal algorithm described above. As such, operator 120 may initiate an insulator disposal/replacement insulator retrieval algorithm and monitor the disposal and retrieval sequences by head-up display 124. In some embodiments, replacement parts may be retrieved based on location and sensors (e.g., accelerometers, short-range transmitters, pressure sensors, and the like). Replacement parts may be retrieved by any of utility arms 306*a*, 306*b*, and auxiliary arm 304.

FIGS. 5A-5B depict embodiments of alternate auxiliary arm 366. As described above, alternate auxiliary arm 366 may extend from a front side of robot unit 302 coupled to platform 322 below central hub 310. In some embodiments, alternate auxiliary arm 366 may provide a known length that operator 120 may use as a reference when controlling aerial robot system 300 to approach energized components in aerial work environment 400. As such, the above-described minimum approach distance may be based in part on a distance measured by alternate auxiliary arm 366. In some embodiments, implement 370 may be a sensor configured to detect electrical energy or magnetic fields providing data indicative of distances to energized components of aerial power system 402.

In some embodiments, implement 370 may be a tool of tools 360, such as the clamp illustrated in FIG. 3A, that may be used for certain operations on aerial power system 402. As such, alternate auxiliary arm 366 may comprise shaft 368 configured to carry the forces associated with the corresponding operations of implement 370. In some embodiments, shaft 368 may be a cylinder (as shown) or tube for resisting torque, or shaft 368 may provide a truss, a square, an I-beam, or the like for supporting various linear loads. In some embodiments, shaft 368 may comprise metal, plastic, or composite (e.g., fiberglass, carbon fiber, and the like). For example, continuing with the above-described embodiment, insulator 404 may be a pin insulator 406 positioned on top of crossmember 412. Alternate auxiliary arm 366 may utilize open-ended wrench to hold a bolt or rotate pin insulator 406 and/or nuts and bolts to remove the pin insulator 406. Accordingly, alternate auxiliary arm 366 may be configured to perform any load handling operations in aerial work environment 400 and, in some embodiments provides dielectric properties as described further below.

Furthermore, as depicted in FIG. 5A, alternate auxiliary arm 366 comprises auxiliary actuator 372 configured to operate implement 370. As shown, implement 370 is an open-ended wrench; however, implement may be a clamp, cutting tool for cutting wires, conductors, and the like, a drill, and the like. Furthermore, implement 370 may be configured to rotate about cylinder 502. Auxiliary actuator 372 may be electromechanical, pneumatic, hydraulic, or any other type of actuator providing motion to implement 370. In some embodiments, implement 370 comprises gears such that opening 380 at the tip of implement 370 is rotated by auxiliary actuator 372. As such, implement 370 may not fully rotate, but parts of implement 370 may be actuated by auxiliary actuator 372.

In some embodiments, alternate auxiliary arm 366 may have one or more degrees of freedom such that alternate auxiliary arm 366 may rotate to and from an operation point. For example, as shown, auxiliary arm 366 may comprise auxiliary arm joint 374 comprising spring 376 providing a restoring force and pivot member 378 providing an axis of rotation. In some embodiments, auxiliary arm joint 374 may comprise an actuator similar to auxiliary actuator 372 providing rotation about pivot member 378, which may be positioned horizontally, vertically, or at any angle such that alternate auxiliary arm 366 may be configured to be rotated to and from an operational position (as shown). Therefore, alternate auxiliary arm 366 may be controlled to be in operational position (as shown) where alternate auxiliary arm 366 may perform work in aerial work environment 400, or alternate auxiliary arm 366 may be controlled to move up, down, to the side, or any other direction such that alternate auxiliary arm 366 is positioned away from aerial power system 402. Positioning alternate auxiliary arm 366 away from aerial power system 402, in some scenarios, may provide a clear path to aerial power system 402 such that robot unit 302 and/or auxiliary arm 304 may perform unobstructed work.

In some embodiments, in a scenario described above, it may be advantageous to move alternate auxiliary arm 304 away from aerial power system 402 to provide unobstructed access to aerial power system 402 by robot unit 302 and/or auxiliary arm 304. Shaft 368 of alternate auxiliary arm 366 may be configured to telescope in and out of outer shaft 380, which, in some embodiments, may be longer or shorter than shown. As such, shaft 368 may telescope into outer shaft 380 to remove implement 370 from aerial power system 402 and shaft may telescope out of outer shaft 380 to move implement 370 to aerial power system 402.

FIG. 5B depicts an exemplary embodiment of alternate auxiliary arm 366 comprising vice 504, which, in some embodiments, may be a standard clamp-style splice or may be a uniquely manufactured device for supporting phases. In some embodiments, shaft 368 may comprise proximal end 368a (connected to platform 322) and distal end 368b (coupled to vice 504). In some embodiments, vice 504 may be coupled to phase 408 as shown in FIG. 4A. Coupling vice 504 to phase 408 places vice 504 at an equal electric potential to phase 408 as shown in FIG. 4B. In some embodiments, shaft 368 may provide an insulating section providing a dielectric gap to maintain proximal end 368a at earth potential. Vice 504 may have dimensions larger than dimensions of phase 408 to ensure that electrical contact is made between vice 504 and phase 408. For example, vice 504 may have a height that is at least 1.5× greater than a height (e.g., diameter) of phase 408. Vice 504 may also be tightly closed to ensure that all or substantially all of the surface area of vice 504 between upper clamp 508 and lower clamp 506 is in contact with phase 408. In some embodiments, vice 504 may comprise electrically conductive material. Other end effectors, or implements 370, for electrically connecting to phases 408 are within the scope hereof. In some embodiments, vice 504 may comprise bolts provided on upper clamp 508 that may screw into nuts provided on lower clamp 506 to clamp down on phase 408.

In some embodiments, implement 370 may be camera 212 or camera 212 may otherwise be disposed at distal end 368b. Camera 212 may be rearward facing (e.g., facing robot unit 302) and accessible by operator 120 is real time to view aerial work environment 400 from a reverse angle relative to robot unit 302. In some embodiments, tools 360, parts, and components of aerial robot system 300 may comprise fiducial markers, short-range communication devices, and the like for location and asset tracking. The fiducial markers, recognition algorithms, and short-range communication may be used as inputs into the automation algorithms as described above.

Figure 6:
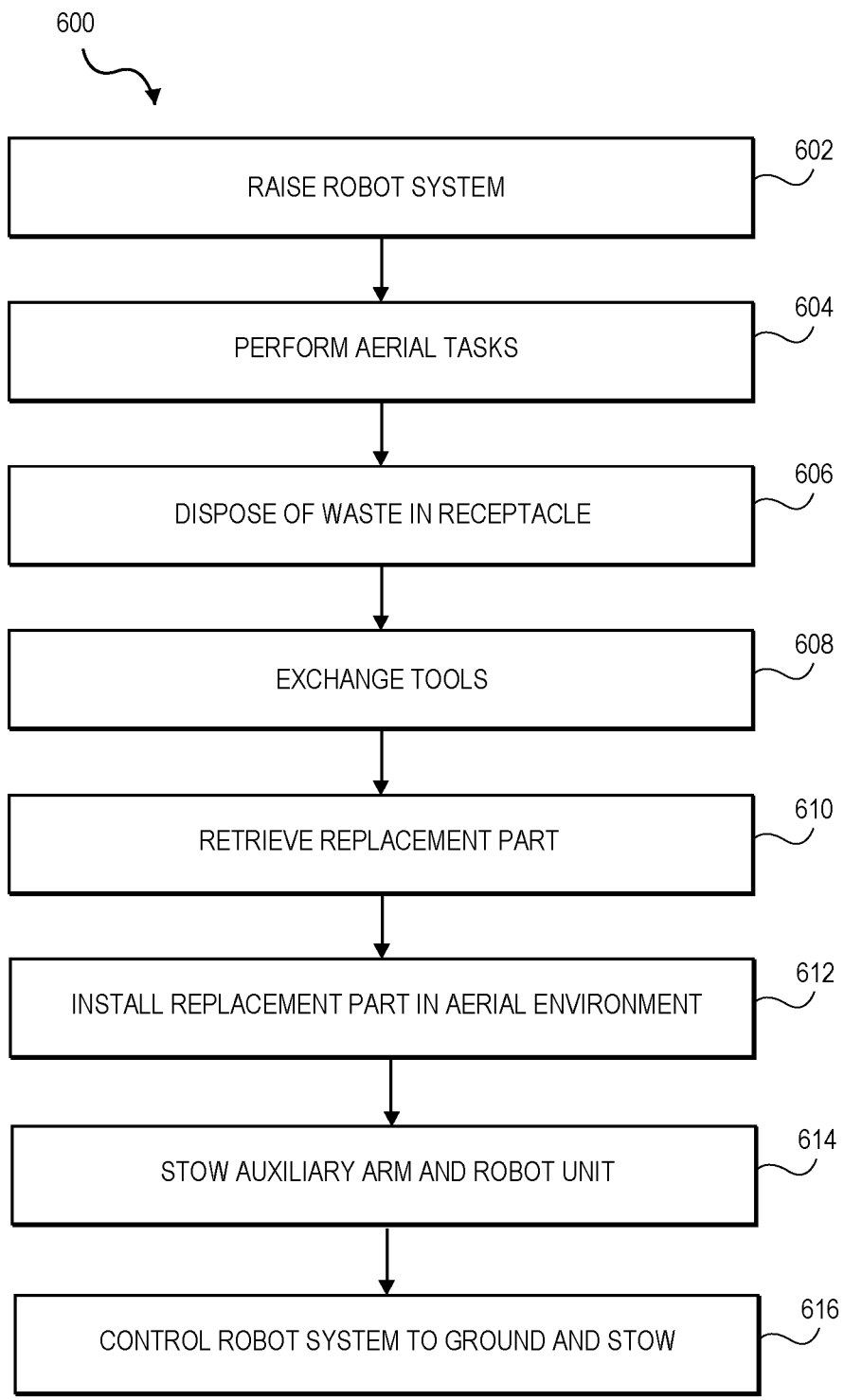
FIG. 6 depicts an exemplary flow chart illustrating some operations of the aerial robot system.

Method of Controlling the Aerial Robot System to Perform Tasks in the Aerial Work Environment FIG. 6 depicts flow chart 600 illustrating a method of controlling aerial robot system 300 to perform tasks in aerial work environment 400. At step 602, aerial robot system 300 is raised to aerial work environment 400 by boom assembly 104. In some embodiments, operator 120 may control boom assembly 104 to raise aerial robot system 300 by inputs on utility vehicle 102 or using input devices 122. In some embodiments, the operations for raising aerial robot system 300 to aerial work environment 400 may be completely or partially automatic. For example, waypoints may be used along with locations sensors at boom tip 112 and/or aerial robot system 300 to move aerial robot system 300 to aerial work environment 400.

Furthermore, as described above, sensors and recognition algorithms may be used to detect locations of aerial components (e.g., phases, poles, crossmembers, and the like) and virtual fences comprising minimum distance thresholds may be generated around aerial robot system 300 and components thereof. As such, utilizing the low profile of the side-by-side-configuration described above, utility vehicle 102 may be positioned on either side of aerial power system 402 and aerial robot system 300 may be maneuvered between upper and lower phases to aerial work environment 400 where the work tasks are performed.

At step 604, aerial robot system 300 may be controlled or may generate commands to perform a task. As described in embodiments above, operator 120 may control robot unit 302 and auxiliary arm 304 to remove an aerial component (e.g., insulator 404) that needs to be replaced. Continuing with the exemplary embodiment described above, operator 120 may control auxiliary arm 304 to grasp and bond to phase 408 and control utility arms 306a, 306b to remove nuts, bolts, and tie wires, to remove phase 408 from insulator 404 and to remove insulator 404 from crossmember 412. Removal of insulator 404 may be performed by operator 120, automatically by preprogramed control algorithms, or by a combination of the two. In some embodiments, operations may be performed without bonding when aerial power system 402 and/or components thereof are offline or grounded. As such, though electrical bonding is described herein, any operations of aerial robot system 300 may be performed without bonding while components of aerial power system 402 is not energized. Furthermore, it should be noted that, when any energized components are contacted by any component of aerial device 100, auxiliary arm 304 may be electrically bonded to aerial power system 402 as described in commonly-owned U.S. application Ser. No. 18/396,009 referenced above.

At step 606, aerial robot system 300 may be controlled to dispose of aerial component and other waste in receptacle 324. In some embodiments, hole 364 in the bottom of receptacle may provide a location for receiving elongated parts. If elongated parts are not needed, cone 416 may be provided in hole 364 such that smaller aerial components do not fall through hole 364.

In some embodiments, removal and disposal of aerial components of aerial power system 402 may be performed by operator 120, automatically by recognition and control algorithms, and/or in a combination of operator 120 controls and automated controls. For example, operator 120 may control aerial robot system 300 to remove insulator 404. Operator 120 may then activate an automatic waste disposal algorithm to place insulator 404 in receptacle 324. As the location of receptacle is known and the insulator geometry is known, the disposal of insulator 404 is repeatable. Furthermore, sensors, (e.g., cameras), and object recognition algorithms may be used to determine the location and geometry of receptacle and adaptive controls may be used to place insulator 404 in receptacle 324. In some embodiments, short range communication may be used to determine reference locations of receptacle 324 and insulator 404 to determine placement.

At step 608, and continuing with the exemplary embodiment described above, robot unit 302 and auxiliary arm 304 may be controlled to retrieve tools 360 from tool rack 334 and, at step 610, to retrieve parts (e.g., new insulator 414) from part holder insert 422 in parts holder 338. Tools 360 may be retrieved automatically or by operator 120 controlling robot unit 302 and/or auxiliary arm 304. Tools 360 may be disposed on tool rack 334 and may comprise assigned locations along with a stored table of locations and/or short-range communication devices such as, BLUETOOTH, RFID, and the like. As such, utility arms 306a, 306b and auxiliary arm 304 may be controlled to the stored locations and/or the detected locations of each tool of the tools 360. Tools 360 may be exchanged with tool rack by simply moving utility arms 306a, 306b in a first direction such that the tool attaches to tool rack 334 by sliding between the prongs 350 as described above. Furthermore, the tool may be removed from tool rack 334 and attached to utility arms 306a, 306b by sliding in a second direction (e.g., opposite to first direction) where tool adapter couples to manipulator adapter and removes the tool from tool rack 334.

At step 610, aerial robot system 300 may be controlled to retrieve a replacement part (e.g., new insulator 414). Continuing with the exemplary embodiment described above, new insulator 414 may be retrieved from part holder insert 422 disposed in parts holder 338. New insulator 414 may be grasped by a tool, for example, high-dexterity clamp 418 and removed from part holder insert 422 and moved to a position near aerial power system 402. Control of the part retrieval operation may be performed by operator 120 and/or by a control algorithm for retrieving the replacement part. As the replacement part is stored in a same location every time, the process may be repeatable. Furthermore, as describe above with respect to the tools 360, replacement parts may similarly be associated with stored locations and may have short-range transmitters supplying known reference locations.

At step 612, aerial robot system 300 may be controlled to install the replacement part on aerial power system 402. Prior to replacing the replacement part on aerial power system 402, auxiliary arm 304 may again electrically bond to aerial power system 402 by the above-described vice 504, or by other methods. The replacement part (e.g., new insulator 414) may be placed into position on aerial power system 402 and attached by utility arms 306a, 306b, and/or auxiliary arm 304, in some scenarios, as described in embodiments above. The replacement part may be attached by operator 120 controlling robot unit 302 and auxiliary arm 304 or by automated commands as described in embodiments above. Furthermore, auxiliary arm 304 may be controlled to position phase 408 to new insulator 414 while robot unit 302 is controlled to attach phase 408 to new insulator 414. To perform these tasks, aerial robot 302 may further be controlled to change any tools necessary as described in embodiments above.

At step 614, aerial robot system 300 may be controlled to detach from aerial power system 402 and stow auxiliary arm 304 and robot unit 302. In some embodiments, all components of robot unit 302 may be detached from and moved to a minimum safe distance from aerial power system 402. Next, auxiliary arm 304 may decoupled from phase 408 removing the electrical bonding. As such, aerial robot system 300 may be removed from aerial work environment 400.

At step 616 aerial robot system 300 may be removed from aerial work environment 400 and brought down to the ground and stowed on utility vehicle 102. In some embodiments, the stowing auxiliary arm 304 and robot unit 302 and bringing aerial robot system 300 to utility vehicle 102 and stowing may be performed by operator 120 or may be performed automatically by a stowing algorithm that may be initiated by operator 120.

Hardware Platform

Figure 7:
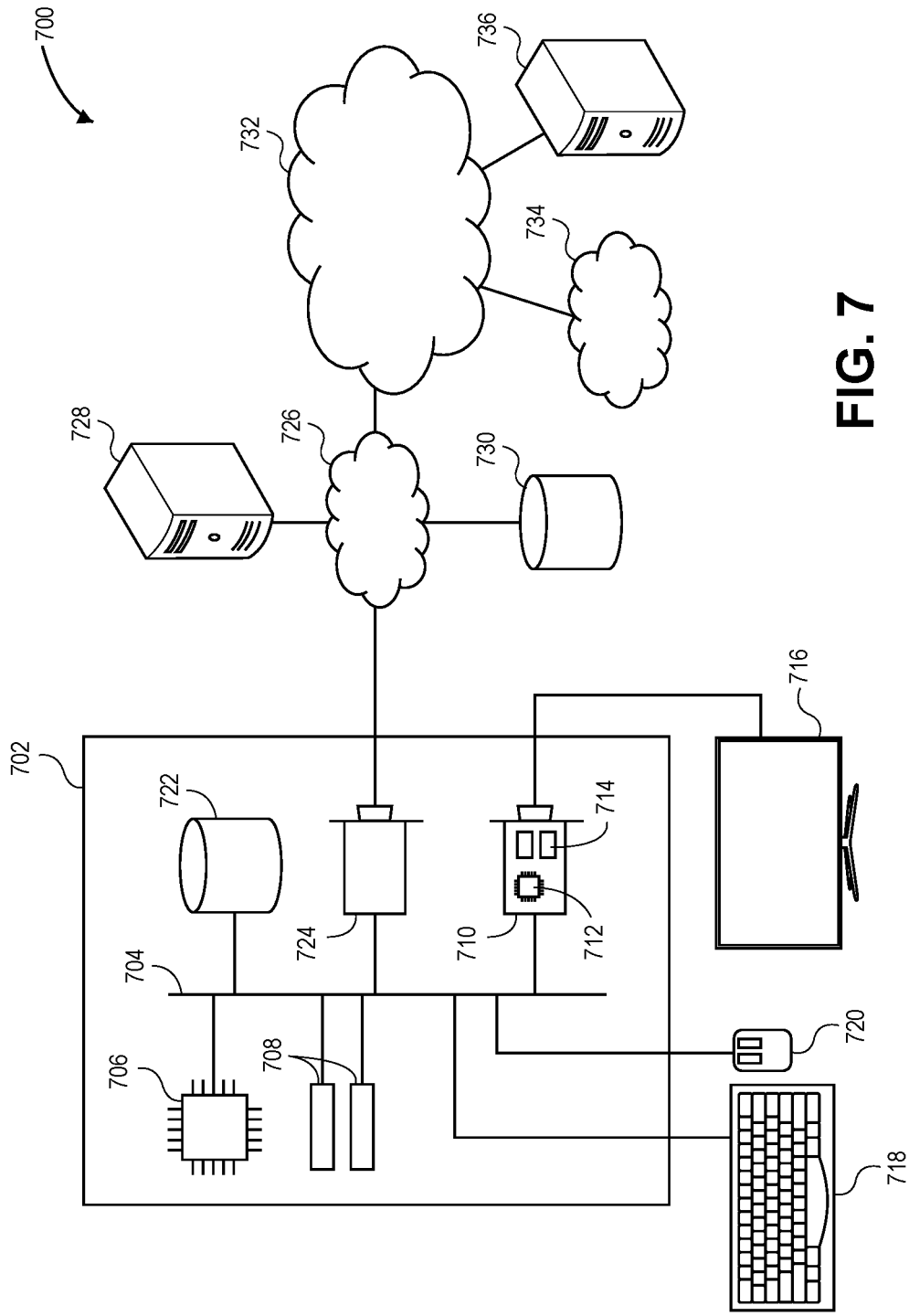
FIG. 7 depicts an exemplary hardware platform for some embodiments.

In FIG. 7, an exemplary hardware platform for computer system 700 for certain embodiments of the invention is depicted. Computer 702 can be a desktop computer, a laptop computer, a server computer, a mobile device such as a smartphone or tablet, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple busses or components may communicate with each other directly. Connected to system bus 704 is central processing unit (CPU) 706. Also attached to system bus 704 are one or more random-access memory (RAM) modules 708. Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments, no display is present, while in others it is integrated into computer 702. Similarly, peripherals such as keyboard 718 and mouse 720 are connected to system bus 704. Like display 716, these peripherals may be integrated into computer 702 or absent. Also connected to system bus 704 is local storage 722, which may be any form of computer-readable media and may be internally installed in computer 702 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through the fiber-optic cable. Examples of stored information include computer-usable instructions, data structures, program modules, and other data representations.

Finally, network interface card (NIC) 724 is also attached to system bus 704 and allows computer 702 to communicate over a network such as local network 726. NIC 724 can be any form of network interface known in the art, such as Ethernet, ATM, fiber, BLUETOOTH, or Wi-Fi (i.e., the IEEE 802.11 family of standards). NIC 724 connects computer 702 to local network 726, which may also include one or more other computers, such as computer 728, and network storage, such as data store 730. Generally, a data store such as data store 730 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 728, accessible on a local network such as local network 726, or remotely accessible over Internet 732. Local network 726 is in turn connected to Internet 732, which connects many networks such as local network 726, remote network 734 or directly attached computers such as computer 736. In some embodiments, computer 702 can itself be directly connected to Internet 732. It should be understood that, in some embodiments, computer 702 may be the controller 224 described in reference to FIG. 2 and may perform similar operations.

Although the presently disclosed subject matter has been described with reference to the embodiments illustrated in the attached drawing figures, it is noted that equivalents may be utilized, and substitutions made herein without departing from the scope of the invention defined by the appended claims.

Accordingly, what is claimed as new and desired to be protected by Letters Patent includes the following:

1. A robot system for performing aerial tasks in an aerial work environment, the robot system comprising:
   at least one processor;
   a platform disposed at a boom tip, the platform comprising a bottom, a top, a first side, a second side, a front, and a back,
   a robot unit disposed on the top of the platform, the robot unit comprising:
      a central hub comprising a central hub bottom coupled to the top of the platform;
      a first utility arm coupled to a central hub first side;
      a second utility arm coupled to a central hub second side,
      wherein the central hub first side and the central hub second side are opposite; and
      a camera mount coupled to a central hub top,
      wherein the central hub top is opposite the central hub bottom; and
      a camera coupled to the camera mount and configured to obtain images of the aerial work environment;
   a robotic auxiliary arm comprising a rotary actuator and configured to perform a second task in the aerial work environment,
   wherein the rotary actuator is disposed at the bottom of the platform and the robotic auxiliary arm is configured to extend to the first side of the platform in a side-by-side configuration with the robot unit;
   and
   one or more input devices associated with a user and communicatively coupled to the at least one processor for controlling the robot unit and the robotic auxiliary arm.

2. The robot system of claim 1, further comprising:
   a plurality of sensors detecting a first position of the first utility arm, a second position of the second utility arm, and an auxiliary arm position of the robotic auxiliary arm,
   wherein the at least one processor is configured to maintain a threshold minimum distance between the first utility arm, the second utility arm, and the robotic auxiliary arm.

3. The robot system of claim 2, wherein the at least one processor is further configured to:
   obtain, from at least one sensor of the plurality of sensors, a location of electrically energized components of an aerial power system, and
   maintain a threshold minimum power distance between components of the robot system and the electrically energized components of the aerial power system.

4. The robot system of claim 1, further comprising:
   a receptacle disposed on the top of the platform adjacent the robot unit and above the rotary actuator,
   wherein the receptacle comprises an opening configured to receive a part disposed in the receptacle.

5. The robot system of claim 4,
   wherein the rotary actuator comprises a rotary hole in a center of the rotary actuator;
   wherein the robot system further comprises a receptacle hole in a receptacle bottom of the opening configured to receive at least a portion of the part.

6. The robot system of claim 4, a plurality of joints configured to provide movement to the robotic auxiliary arm, wherein a joint of the plurality of joints is disposed below the receptacle.

7. The robot system of claim 4, further comprising:
   a tool rack coupled to the platform, wherein the receptacle is disposed between the tool rack and the central hub, and
   wherein the tool rack comprises a plurality of tool holders configured to hold tools.

8. The robot system of claim 7,
   wherein the tool rack is a linear rack, arc, or carousel, and
   wherein the tools are configured to be coupled to at least the first utility arm in an automated attachment process.

9. A robot system for performing aerial tasks in an aerial work environment, comprising:
   at least one input device configured to receive input by an operator of the robot system;
   a platform disposed on a boom tip of an aerial device, the platform comprising a top, a bottom, a first side, a second side, a front, and a back;
   a robot unit disposed on the top of the platform, the robot unit comprising:
      a central hub comprising a central hub bottom coupled to the top of the platform at the central hub bottom;
      a first utility arm coupled to a central hub first side;
      a second utility arm coupled to a central hub second side,
      wherein the central hub first side and the central hub second side are opposite; and
      a camera mount coupled to a central hub top,
      wherein the central hub top is opposite the central hub bottom; and
      a camera coupled to the camera mount and configured to obtain images of the aerial work environment;
   an auxiliary arm comprising a rotary actuator disposed at the bottom of the platform, wherein the auxiliary arm is arranged to the first side of the platform in a side-by-side configuration with the robot unit to minimize a vertical physical profile of the robot system;
   sensors disposed on the platform and configured to detect a state of the aerial work environment including a robot state of the robot unit and the auxiliary arm;
   at least one processor configured to receive input commands, generate automated commands, and cause actuation of a plurality of actuators to control the robot unit and the auxiliary arm; and one or more non-transitory computer-readable media comprising computer-executable instructions that, when executed by the at least one processor, are configured to:
receive a first input by the at least one input device to control the first utility arm, the second utility arm, and the auxiliary arm to perform a first task in the aerial work environment;
control the first utility arm, the second utility arm, and the auxiliary arm to perform the first task in the aerial work environment based on the first input;
receive a second input by the at least one input device to activate an automated sequence; and
control at least one of the first utility arm or the second utility arm to perform the automated sequence.

10. The robot system of claim 9, further comprising:
a tool rack comprising tools configured to attach to the first utility arm; and
wherein the automated sequence comprises:
receiving input from the operator to attach a tool of the tools to the first utility arm;
obtaining an automated tool exchange algorithm based at least in part on a task and comprising instructions to couple the tool to the first utility arm; and
controlling the first utility arm to couple the tool to the first utility arm as instructed by the automated tool exchange algorithm.

11. The robot system of claim 10, further comprising:
a receptacle comprising an opening for receiving parts; and
wherein the automated sequence further comprises:
receiving input from the operator to place the part in the receptacle;
obtaining an automated waste disposal algorithm comprising instructions to control the first utility arm to place the part in the receptacle; and
controlling the first utility arm to place the part in the receptacle as instructed by the automated waste disposal algorithm.

12. The robot system of claim 11,
wherein the receptacle is coupled to the platform between the robot unit and the auxiliary arm; and
wherein the tool rack is coupled to the receptacle.

13. The robot system of claim 9,
wherein the first utility arm comprises a first shoulder portion and the second utility arm comprises a second shoulder portion, and
wherein the automated sequence comprises automatically maintaining the first shoulder portion in an upward direction relative to the platform and the second utility arm in a downward direction relative to the platform.

14. The robot system of claim 13,
further comprising a plurality of tools disposed on a tool rack; and
wherein the automated sequence comprises:
obtaining a tool from the tool rack by the first utility arm while the auxiliary arm is configured to be in the side-by-side configuration.

15. The robot system of claim 9, wherein the computer-executable instructions are further configured to:
automatically maintain a minimum threshold distance between the first utility arm, the second utility arm, and the auxiliary arm; and
provide haptic, visual, or audible feedback by the at least one input device when the first utility arm, the second utility arm, or the auxiliary arm approach the minimum threshold distance.

16. A method of controlling an aerial robot system to perform aerial tasks in an aerial work environment, the method comprising:
receiving a first input by an input device to control a first utility arm and a second utility arm of a robot unit and control an auxiliary arm to perform a first task in the aerial work environment,
wherein the robot unit comprises a central hub disposed on a top of a platform,
wherein the first utility arm is disposed on a central hub first side and the second utility arm is disposed on a central hub second side,
wherein the central hub second side is opposite the central hub first side;
obtaining images of the aerial work environment by a camera mounted on a central hub top,
wherein the auxiliary arm comprises a rotary actuator disposed at a bottom of the platform opposite the central hub,
wherein the bottom of the platform is opposite the top of the platform,
receiving a second input by the input device to activate an automated sequence; and
controlling the first utility arm and the second utility arm to perform the automated sequence.

17. The method of claim 16, wherein a task of the aerial tasks is removal of an aerial component from the aerial work environment by operating the first utility arm and the second utility arm.

18. The method of claim 17, wherein the automated sequence comprises:
controlling at least one of the first utility arm or the second utility arm to place the aerial component into a receptacle; and
retrieving a replacement component from a parts holder.

19. The method of claim 18,
wherein the aerial component is a pin insulator; and
the method further comprises:
placing the pin insulator into the receptacle in a vertical orientation with a pin of the pin insulator pointing downward; and
inserting the pin into a hole at a receptacle bottom of the receptacle.

20. The method of claim 16,
wherein the auxiliary arm is a first auxiliary arm; and
wherein the method further comprises:
grasping and supporting a supported phase by a second auxiliary arm,
wherein the second auxiliary arm comprises a dielectric material based on an expected voltage of the supported phase.

* * * * *